US005657086A

United States Patent [19]

Tahara et al.

[11] Patent Number: 5,657,086
[45] Date of Patent: Aug. 12, 1997

[54] HIGH EFFICIENCY ENCODING OF PICTURE SIGNALS

[75] Inventors: Katsumi Tahara, Kanagawa; Nobuhisa Obikane, Chiba, both of Japan

[73] Assignee: Sony Corporation, Tokyo, Japan

[21] Appl. No.: 221,353

[22] Filed: Mar. 31, 1994

[30] Foreign Application Priority Data

Mar. 31, 1993 [JP] Japan .................................. 5-097151

[51] Int. Cl.[6] ................................................. H04N 7/36
[52] U.S. Cl. .......................... 348/412; 348/403; 348/415
[58] Field of Search ..................................... 348/400, 401, 348/404, 407, 402, 403, 411, 412, 413, 699, 416, 409

[56] References Cited

U.S. PATENT DOCUMENTS

| 4,546,386 | 10/1985 | Matsumoto et al. | 348/412 |
| 4,837,618 | 6/1989 | Hatori et al. | 348/401 |
| 5,068,724 | 11/1991 | Krause et al. | 348/402 |
| 5,091,782 | 2/1992 | Krause et al. | 348/400 |
| 5,173,773 | 12/1992 | Ueda et al. | 348/407 |
| 5,347,308 | 9/1994 | Wai | 348/420 |
| 5,347,309 | 9/1994 | Takahashi | 348/401 |

FOREIGN PATENT DOCUMENTS 510 972  10/1992  European Pat. Off. .
512 854  11/1992  European Pat. Off. .

OTHER PUBLICATIONS

Patent Abstracts of Japan vol. 17,No. 371 (E–1396) 13 Jul. 1993, JP–A–05 056 415 (NTT) 5 Mar. 1993.

Signal Processing. Image Communication, vol. 4, No. 4/5, Aug. 1992, Amsterdam NL pp. 389–399 Jass et al 'a versatile dct coding system for hdtv with interlaced and progressive scanning.

IEEE Transactions on Circuits and Systems for Video Technology vol. 1, No. 1, Mar. 1991, New York US pp. 4–13 Barbero et al 'bit–rate reduction system for hdtv transmission'.

*Primary Examiner*—Tommy P. Chin
*Assistant Examiner*—A. Au
*Attorney, Agent, or Firm*—William S. Frommer; Alvin Sinderbrand

[57] ABSTRACT

Picture signals are encoded so that one of a frame-based orthogonal transformation or a field-based orthogonal transformation is selected as a function of frame-based orthogonal-transformation coefficients and field-based orthogonal transformation coefficients. The coefficients representing the smallest quantity of data are selected and encoded for transmission. Alternatively, a picture signal is encoded so that one of intra-frame coding and inter-frame coding, as well as either a frame-based or field-based orthogonal transformation, are selected as a function of the respective orthogonal transformation coefficients.

39 Claims, 15 Drawing Sheets

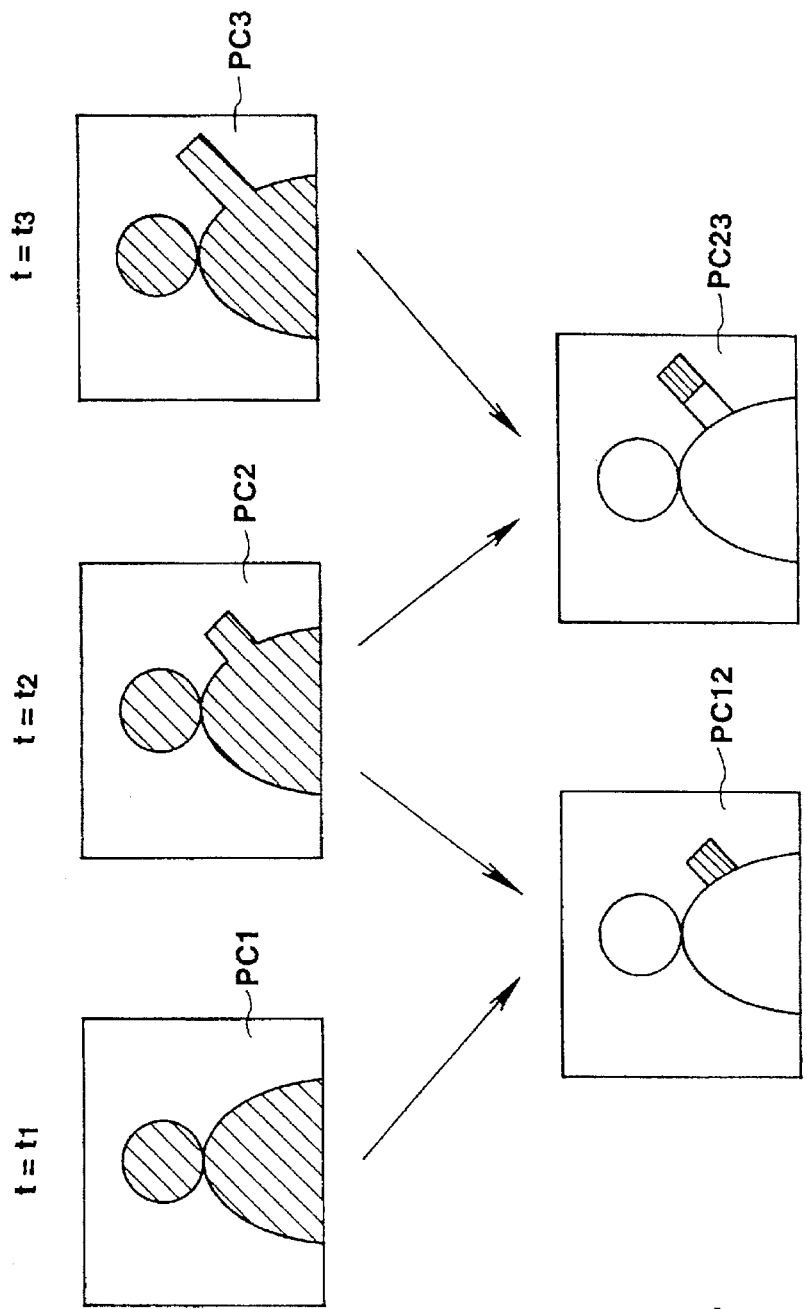

FIG.7C
RELATED ART
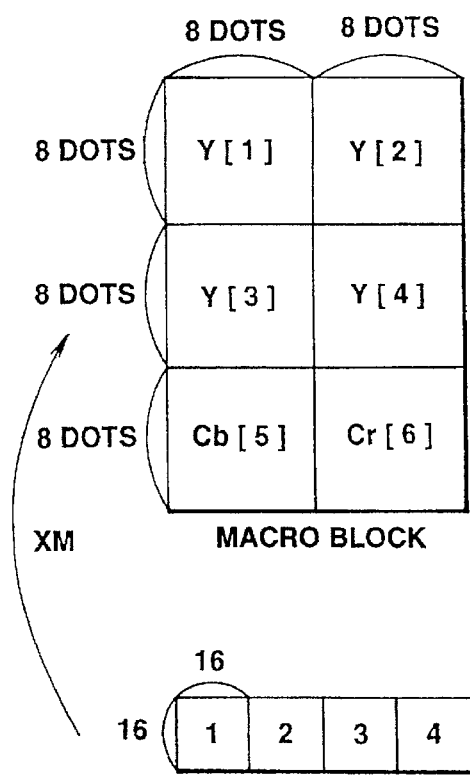
MACRO BLOCK
FIG.7A
RELATED ART
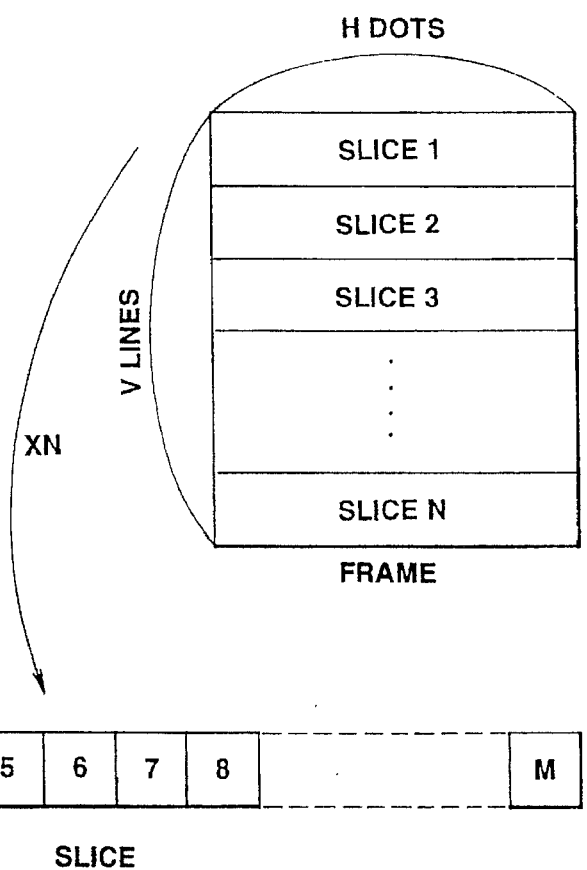
FRAME
SLICE
FIG.7B
RELATED ART

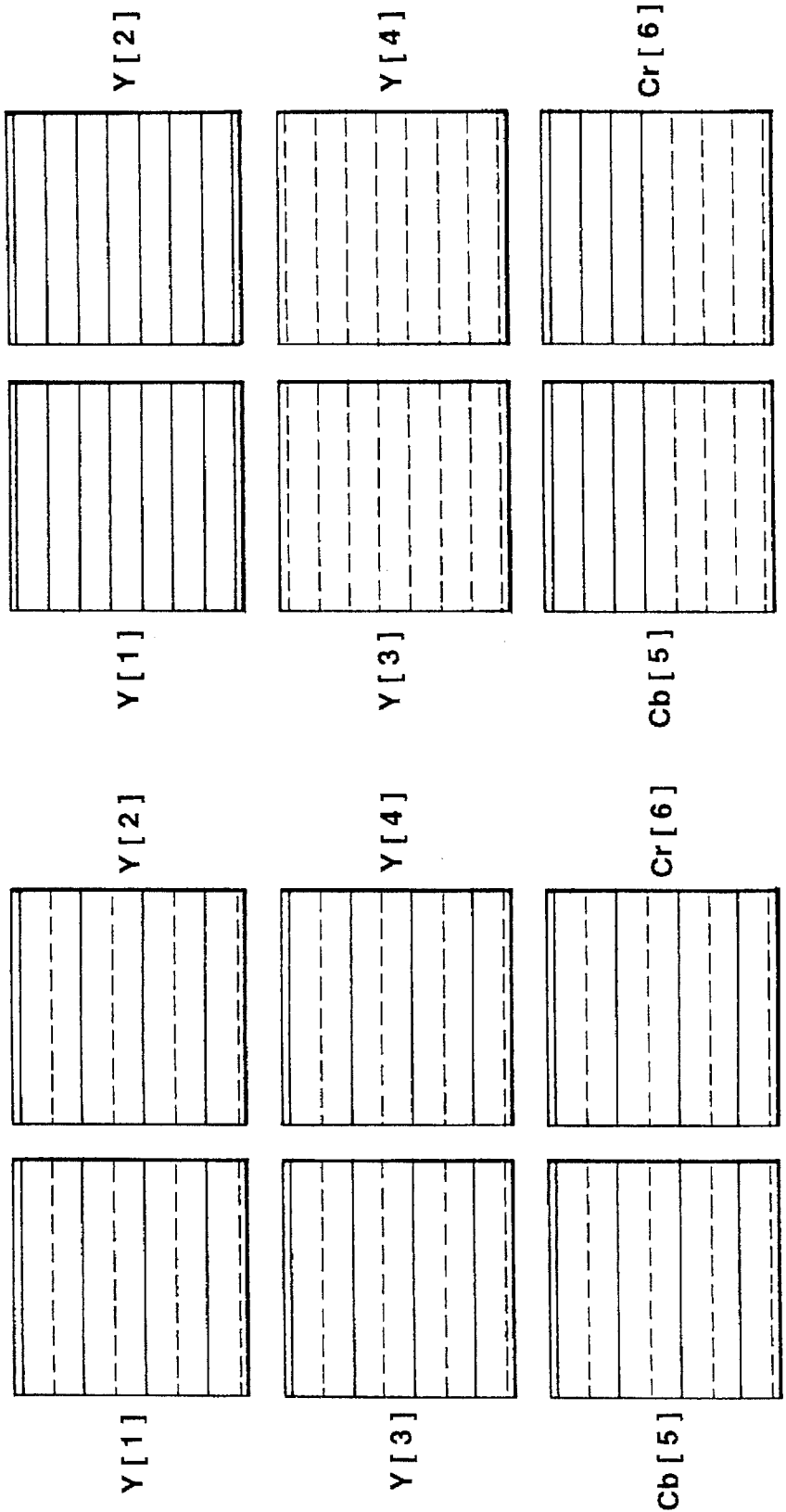
FIG.10A RELATED ART (FRAME DCT MODE)
FIG.10B RELATED ART (FIELD DCT MODE)

HIGH EFFICIENCY ENCODING OF PICTURE SIGNALS

BACKGROUND OF THE INVENTION

The present invention relates to apparatus and methods for encoding picture signals, and, more particularly, to encoding of picture signals using predictive encoding and orthogonal transformations.

In a teleconferencing system or a video telephone system, for example, moving picture signals are compressed and encoded by taking advantage of intra-frame and inter-frame correlation so that they can be more efficiently transmitted over a communication channel to a remote location.

Intra-frame correlation can be utilized by an orthogonal transformation, such as a discrete cosine transformation (DCT).

Inter-frame correlation can be utilized by predictive encoding between successive pictures. As used herein, a picture generally refers to an image represented by a frame of video information. When the fields of a frame are coded in a non-interlaced manner, that is, separately, each field may be referred to as a picture.

As shown in FIG. 1A, for example, frame pictures PC1, PC2 and PC3 are generated at time points t1, t2 and t3. As shown by shading in FIG. 1B, the difference between the frame pictures PC1 and PC2 is obtained as difference picture data PC12, and the difference between the frame pictures PC2 and PC3 is obtained as difference picture data PC23. Since there is a fairly small change between signals of temporally neighboring frames, transmission of only the difference picture data utilizes the transmission channel more efficiently than transmission of the original pictures. That is, using the difference picture data as encoded picture signals, referred to as predictive encoding, reduces the amount of data to be transmitted.

However, if only the difference signals are transmitted, the original picture cannot be restored. It is advantageous to occasionally transmit a picture which is not predictively encoded as a reference for difference picture data, and because it is sometimes more efficient than transmitting the picture as a predictively encoded picture.

Pictures which are encoded utilizing only intra-frame correlation and not inter-frame correlation, are referred to herein as intra-pictures or I-pictures.

Pictures which are encoded with predictive encoding relative to one previously encoded picture are referred to herein as predictive pictures or P-pictures. The previously encoded picture may be an I-picture or a P-picture, and temporally precedes the P-picture.

Pictures which are encoded with predictive encoding relative to at most two pictures, that is, relative to only a temporally succeeding picture or relative to both a temporally preceding and a temporally succeeding picture, are referred to herein as bi-directionally predictive coded pictures or B-pictures. When the predictive encoding is relative to two pictures, the two pictures may be I-pictures or P-pictures, or one of each, and the mean value of the two pictures is obtained and used as a reference picture for the picture to be encoded.

A series of pictures may be considered as groups of pictures having a predetermined number of frames such as F1 ... F17. The luminance and chrominance picture signals of the leading frame F1 are encoded as an I-picture, the picture signals of the second frame F2 are encoded as a B-picture, and the picture signals of the third frame F3 are encoded as a P-picture. The fourth and the following frames F4 to F17 are encoded alternately as B-pictures and P-pictures. FIG. 2A shows the reference pictures used for encoding P-pictures, while FIG. 2B shows the reference pictures used for encoding B-pictures.

As shown in FIGS. 3A and 3B, there are four methods for encoding the macro-blocks (discussed below) of a picture. When multiple methods are suitable, the method which will give the smallest amount of encoded data is employed on a macro-block by macro-block basis. Blocks F0 to F5 in FIG. 3A represent data for frames of moving picture signals, whereas blocks F1X to F5X in FIG. 3B represent data for encoded frames. The solid line arrows in FIG. 3A show the frames to which motion vectors x0 ... x6 relate.

The first method, shown as SP1, is to not use predictive encoding, that is, to use only intra-frame correlation. This method is suitable for any macro-block of an I-picture, a P-picture and a B-picture. In other words, if less encoded data is produced without predictive encoding, then this method is selected.

The second method, shown as SP2, is to predictively encode relative to a picture which temporally succeeds the current picture, referred to as backward predictive encoding. The third method, shown as SP3, is to predictively encode relative to a picture which temporally precedes the current picture, referred to as forward predictive encoding. The second method is suitable for macro-blocks of only B-pictures. The third method is suitable for macros-blocks of P-pictures or B-pictures.

The fourth method, shown as SP4, is to predictively encode relative to the mean value of two pictures, one temporally preceding and one temporally succeeding the current picture. This method is suitable for macro-blocks of only B-pictures.

To encode a sequence of frames, frame F1 is first encoded as an I-picture using the first method SP1 so that it is directly transmitted over a transmission channel as encoded data F1X.

Frame F3 is then encoded as a P-picture. When the third method SP3, forward predictive coding, is used for a macro-block, a motion vector x3 representing the motion between the current picture F3 and the temporally preceding frame F1, used as the reference picture, and difference signals representing the difference between a motion compensated reference picture F1 and the current picture F3, as indicated by a broken-line arrow SP3, are calculated and encoded as data F3X for that macro-block. Alternatively, if a smaller amount of encoded data is produced for a macro-block of the P picture being encoded, the first method SP1 can be used wherein the data of the original frame F3 are directly utilized as the transmission data F3X for that macro-block.

Frame F2 is then encoded as a B-picture. When the fourth method SP4 is used to encode a macro-block of the frame F2, a difference between the mean value of the temporally preceding frame F1 and the temporally succeeding frame F3 is calculated, on a pixel by pixel basis. The difference data and the motion vectors x1 and x2 are encoded as data F2X. Alternatively, when the first processing method SP1 is used to encode a macro-block of the frame F2, the data of the original frame F2 forms the encoded data F2X.

When one of the second or third methods SP2, SP3 is used to encode a macro-block of the frame F2, one of the difference between the temporally succeeding frame F3 and the current frame F2, and the difference between the temporally preceding frame F1 and the current frame F2 is calculated. The difference data and one of the motion vectors x1, x2 are encoded as the data F2X.

The frame F4 for the B-picture and the frame F5 for the P-picture are processed in a similar manner as described above to generate transmitted data F4X and F5X.

Spatial redundancy within a picture is reduced by an orthogonal transformation, such as a discrete cosine transformation (DCT), of a portion of the picture from the time domain into the frequency domain. A block of pixel data from the picture having a dimension of, for example, 8 pixels width ×8 rows height, representing luminance or chrominance amplitudes at the respective pixels, is converted by DCT transformation into a block of 8×8 frequency coefficients, which is scanned in a predetermined zigzag manner from low frequency to high frequency to provide a sequence of 64 coefficients representing the amounts of respective frequencies contained in the block. The first coefficient is referred to as the DC coefficient, while the other 63 coefficients are referred to as the AC or high frequency coefficients. A pixel block representing a solid portion of an image corresponds to a DC coefficient indicating the amplitude of the solid portion, and no high frequency coefficients. A pixel block representing a highly detailed image portion corresponds to coefficient data with many non-zero AC values.

A picture of a natural scene tends to be smooth, that is, to lack highly detailed image portions. Consequently, the pixel blocks of such a picture correspond to DCT coefficients lacking AC coefficients, that is, having runs of zero data. These runs of zero data are variable length coded by representing them as a run-length number indicating how many zeros are in the run. The run-length value is further encoded using a Huffman code.

At the decoder, the encoded signal is variable length decoded (inverse variable length coded), and then inverse DCT transformed to recover the original pixel data for the picture.

Applying the techniques of predictive encoding and orthogonal transformation to a picture sequence removes significant amounts of temporal and spatial redundancy from the picture sequence and results in a highly efficiently encoded representation of the picture sequence.

An area of a picture includes pixels in odd-numbered rows and pixels in even-numbered rows. In progressive scanning, the rows of pixels in a frame are scanned from top to bottom. During display, the pixels are presented in this same order. In interlace scanning, first the odd-numbered rows of pixels forming an odd field in a frame are scanned, then the even-numbered rows of pixels forming an even field in the frame are scanned. During display, the odd field is displayed and then the even field is displayed such that its rows are interlaced with the rows in the odd field.

If motion is represented in a sequence of interlaced scanned pictures, each frame exhibits comb-like deformation. FIG. 4 shows an image of a car moving from the left side of the picture to the right side of the picture. When the odd field is scanned, the car is in one position. By the time that the even field is scanned, the car has advanced towards the right. During display of the interlaced scanned fields of a frame representing this picture, the edges represented by the even field are shifted with respect to the edges represented by the odd field, causing the edges of an object to appear jagged. The comb deformation may be particularly seen in a vertical edge, such as the front of the car.

In frame-based processing of an interlaced scanned picture, the pixel rows in an area of the picture are processed while the odd-numbered rows and even-numbered rows are interlaced, as shown in FIG. 5A. DCT transformation is typically performed on a block of interlaced picture data of size 8 pixels ×8 rows.

In field-based processing of an interlaced scanned picture, the rows in the odd field in an area of a picture are separated from the rows in the even field in that area, and all of the rows in the odd field are processed separately from the rows in the even field, as shown in FIG. 5B. DCT transformation is typically performed on an 8×8 block of data representing either an odd field or an even field of a picture area, that is, DCT transformation is performed on an 8×8 block of segregated picture data.

The amount of DCT coefficient data needed to represent a picture is influenced by the nature of the image represented in the picture. As an example, the amount of motion represented in a picture often has a large influence on the orthogonal transformation. As shown in FIG. 4, an area representing the street is uniform and is suitable for frame-based DCT transformation. However, an area representing the front edge of the car in FIG. 4 is ill-suited for frame-based DCT transformation, as a substantial amount of high frequency coefficients in a transformed block will have non-zero value, reducing the length of zero runs, and thus reducing the efficiency of the variable length code.

In contrast, in field-based processing, the rows in the odd field in the edge of the car are considered separately from the rows in the even field so that no abrupt transitions need be represented, that is, only smoothly changing edges need be represented, dramatically reducing the amount of high frequency coefficient data relative to when the rows are processed in interlaced form. Correspondingly, the zero runs in field-based DCT transformation of the edge of the car are longer than those in frame-based DCT transformation, so less variable length code encoded data is needed to represent the car edge using field-based DCT transformation.

FIG. 6 illustrates an arrangement for encoding and decoding moving picture signals in accordance with the above-described predictive encoding scheme. As shown in FIG. 6, a coding device 1 encodes input picture signals and transmits the encoded signals to a recording medium 3 as a transmission channel for recording. A decoding device 2 reproduces the signals recorded on the recording medium 3 and decodes these as output signals.

The coding device 1 includes an input terminal 10, a pre-processing circuit 11, A/D converters 12 and 13, a frame memory 14 including a luminance signal frame memory 15 and a color difference signal frame memory 16, a format converter 17 and an encoder 18.

Input terminal 10 is adapted to receive a video signal VD and to supply the signal VD to pre-processing circuit 11 which functions to separate the video signal VD into luminance signals and color signals, herein chrominance or color difference signals, that are applied to analog-to-digital (A/D) converters 12 and 13, respectively. The video signals, digitized by analog-to-digital conversion by the A/D converters 12 and 13, are supplied to frame memory 14 having memories 15, 16 which function to store the luminance signals and the color difference signals, respectively, and to read out the signals stored therein to format converter 17.

The converter 17 is operative to convert frame format signals stored in the frame memory section 14 into block format signals. As shown in FIG. 7A, pictures are stored in the frame memory section 14 as frame-format data having V lines each consisting of H dots. The converting circuit 17 divides each frame into N slices, each slice comprising a multiple of 16 lines. As shown, in FIG. 7B, the converter 17 divides each slice into M macro-blocks. As shown in FIG.

7C, each macro-block represents luminance signals Y corresponding to 16×16 pixels or dots, and associated chrominance Cr, Cb signals. These luminance signals are subdivided into blocks Y1 to Y4, each consisting of 8×8 dots. The 16×16 dot luminance signals are associated with 8×8 dot Cb signals and 8×8 dot Cr signals. The converter 17 is also operative to supply the block format signals to the encoder 18, which is described in detail below with reference to FIG. 8.

The encoder 18 operates to encode the block format signals and to supply the encoded signals as a bitstream over a transmission channel for recording on the recording medium 3.

The decoding device 2 includes a decoder 31, a format converter 32, a frame memory section 33 including a luminance signal frame memory 34 and a color difference signal frame memory 35, digital-to-analog converters 36 and 37, a post-processing circuit 38 and an output terminal 30.

The decoder 31 is operative to reproduce encoded data from the recording medium 3 and to decode the encoded data, as described in detail below with reference to FIG. 12, and to supply decoded data signals to format converter 32 which is operative to convert the decoded data signals into frame format data signals and to supply the frame format data signals as luminance signals and color difference signals to the memory 33. The memories 34, 35 of the memory 33 function to store the luminance and chrominance signals, respectively, and to apply these signals to D/A converters 36 and 37, respectively. The analog signals from converters 36, 37 are synthesized by a post-processing circuit 38 which functions to form output picture signals and to output them to output terminal 30, and thence to a display unit, such as a CRT, not shown, for display.

FIG. 8 illustrates the encoder 18 shown in FIG. 6. Generally, the encoder 18 stores three pictures, the current picture and the pictures temporally preceding and succeeding the current picture. Based on the sequential position of the current picture in the group of pictures, the picture coding type (I, P or B) is selected for each picture.

The encoder 18 also chooses one of frame-based and field-based predictive encoding as will be explained with reference to FIG. 9, and further chooses one of frame-based and field-based DCT encoding as will be explained with reference to FIG. 10. For each picture, appropriate motion vectors are obtained and the picture is predictively encoded relative to zero, one or two previously encoded pictures which have been locally decoded and which are referred to as reference pictures to form a difference data signal. The difference data signal is orthogonally transformed into blocks of coefficient data which are quantized, variable length encoded and transmitted as encoded data.

The encoder 18 includes a local decoder in which the quantized data are dequantized, inverse orthogonally transformed, and stored as the reference pictures. In accordance with predictive encoding, the motion vector(s) obtained for the current picture is (are) applied to the reference picture(s) to produce a predictive picture which is subtracted from the current picture to yield the difference data.

The elements of the encoder 18 will now be explained in detail.

Picture data for encoding is supplied macro-block by macro-block to an input terminal 49 and thence to a motion vector detector 50 which is operative to process the picture data of respective frames as I-pictures, P-pictures or as B-pictures, in accordance with a predetermined sequence for each group of pictures, as shown for example, in FIGS. 2A, 2B. The circuit 50 applies the picture data of the current frame to a frame memory 51 having frame memories 51a, 51b, 51c used for storing a temporally preceding picture, the current picture and a temporally succeeding picture, respectively.

More specifically, the frames F1, F2, F3 are stored in the memories 51a, 51b, 51c, respectively. Then the picture stored in memory 51c is transferred to memory 51a and the frames F4, F5 are stored in the memories 51b, 51c, respectively. The operations of transferring the picture in memory 51c to memory 51a and storing the next two pictures in memories 51b, 51c are repeated for the remaining pictures in the group of pictures.

After the pictures are read into the memory and temporarily stored, they are read out and supplied to a predictive mode switching circuit 52 which is adapted to process the current picture for one of frame-based and field-based predictive encoding. After processing the first frame picture data in a group of pictures as an I-picture and before processing the second frame picture as a B-picture, the motion vector detector 50 processes the third frame P-picture. The processing sequence is different from the sequence in which the pictures are supplied because the B-picture may involve backward prediction, so subsequent decoding may require that the P-picture temporally succeeding the B-picture have been previously decoded.

The motion vector detector 50 calculates as an estimated value for intra-coding for each macro-block, the sum of absolute values of predictive errors for the frame predictive mode for each macro-block and the sum of absolute values of predictive errors for the field predictive mode for each macro-block and supplies these sums to the predictive judging circuit 54 which compares these sums and selects frame predictive mode or field predictive mode in accordance with the smallest of these values and provides the selected mode to predictive mode switching circuit 52.

If the frame predictive mode is selected, the predictive mode switching circuit 52 outputs the four luminance blocks Y1 to Y4 and the two chrominance or color difference blocks Cb, Cr of each macro-block received from the motion vector detector 50 without processing. As shown in FIG. 9A, odd or first field line data, indicated by solid lines, and even or second field line data, indicated by dashed lines, alternate in each luminance and color difference block as received from the motion vector detector 50. In FIG. 9A, a indicates units for motion compensation. In the frame predictive mode, motion compensation is performed with four luminance blocks (macro-blocks) as a unit and a single motion vector is associated with the four luminance blocks Y1 to Y4.

If the field predictive mode is selected, the predictive mode switching circuit 52 processes the signals received from the motion vector detector 50 so that each of the four luminance blocks comprises data from a single field and the two color difference blocks have non-interlaced odd and even field data. Specifically, as shown in FIG. 9B, the luminance blocks Y1 and Y2 have odd-field data and the luminance blocks Y3 and Y4 have even-field data, while the upper halves of the color difference blocks Cb, Cr represent odd field color difference data for the luminance blocks Y1 and Y2 and the lower halves of the color difference blocks Cb, Cr represent even field color difference data for the luminance blocks Y3 and Y4. In FIG. 9B, b indicates units for motion compensation. In the field predictive mode, motion compensation is performed separately for the odd-field blocks and even-field blocks so that one motion vector is associated with the two luminance blocks Y1 and Y2 and another motion vector is associated with the two luminance blocks Y3 and Y4.

The predictive mode switching circuit 52 supplies the current picture, as processed for frame-based or field-based predictive encoding, to arithmetic unit 53 of FIG. 8. The arithmetic unit 53 functions to perform one of intra-picture prediction, forward prediction, backward prediction or bi-directional prediction. A predictive judging circuit 54 is adapted to select the best type of prediction in dependence upon the predictive error signals associated with the current picture signals.

The motion vector detector 50 calculates, for the current picture, the sum of the absolute values of the differences between each signal Aij and the average value $\overline{A}$ of the signals Aij in each macro-block, $\Sigma|Aij-\overline{A}|$, and supplies the sum as an estimated value for intra-coding to the predictive judging circuit 54.

The motion vector detector 50 calculates the sum of absolute values (or sum of squares) of the difference (Aij–Bij) between signals Aij of the macro-blocks of the current picture, and signals Bij of the macro-blocks of the predictive picture, $\Sigma|Aij-Bij|$, in each of the frame predictive mode and the field predictive mode. As explained above, the motion vector(s) for the current picture are applied to the reference picture(s) to generate the predictive picture. When the reference picture temporally precedes the current picture, the quantity $\Sigma|Aij-Bij|$ is referred to as a forward predictive error signal, and when the reference picture temporally succeeds the current picture, the quantity $\Sigma|Aij-Bij|$ is referred to as a backward predictive error signal. When the predictive picture is the mean of a temporally preceding and a temporally succeeding reference picture, as motion-compensated, the quantity $\Sigma|Aij-Bij|$ is referred to as a bi-directional predictive error signal.

The motion vector detector 50 supplies the forward frame predictive, the forward field predictive, the backward frame predictive, the backward field predictive, the bi-directional frame predictive and the bi-directional field predictive error signals to the predictive judging circuit 54.

The predictive judging circuit 54 selects one of intra-coding, forward inter-picture prediction, backward inter-picture prediction or bi-directional inter-picture prediction and one of the frame and field predictive modes in accordance with the smallest of the estimated value for intra-coding and the forward frame, the forward field, the backward frame, the backward field, the bi-directional frame and the bi-directional field predictive error signals. The arithmetic unit 53 predictively encodes the current picture, as processed by the predictive mode switching circuit 52, in accordance with the predictive mode selected by the predictive judging circuit 54.

The motion vector detector 50 serves to calculate and supply the motion vector(s) associated with the selected predictive mode to a variable length coding circuit 58 and a motion compensation circuit 64, explained later.

The sums of the absolute values of the inter-frame differences (predictive errors) on the macro-block basis are supplied from the motion vector detector 50 to the predictive mode switching circuit 52 and to the predictive judging circuit 54, in the manner as described above.

The arithmetic unit 53 supplies predictively encoded data, also referred to as difference data, for the current picture to a DCT mode switching circuit 55 which is adapted to process the current picture for one of frame-based and field-based orthogonal transformation.

The DCT switching circuit 55 functions to compare the encoding efficiency when the DCT operations for the macro-blocks in a picture are performed with the odd field data alternating with the even field data, that is, for frame-based orthogonal transformation, as shown in FIG. 10A, with the encoding efficiency when the DCT operations for the macro-blocks in a picture are performed with the odd field data separated from the even field data, that is, for field-based orthogonal transformation, as shown in FIG. 10B. The circuit 55 functions to select the mode with the higher encoding efficiency.

To evaluate the encoding efficiency for frame-based orthogonal transformation, the DCT mode switching circuit 55 places the luminance macro-block data into interlaced form, as shown in FIG. 10A, and calculates the differences between the odd field line signals and even field line signals vertically adjacent to each other, and finds the sum of absolute values of the differences EFM, or the sum of squared values of the differences.

$$EFM = \sum_{j=1}^{16}\sum_{i=1}^{16} |o(i,j) - e(i,j)| + \sum_{j=1}^{16}\sum_{i=1}^{15} |e(i,j) - o(i+1,j)| \quad \text{Eqn. 1}$$

To evaluate the encoding efficiency for field-based orthogonal transformation, the DCT mode switching circuit 55 places the luminance macro-block data into non-interlaced form, as shown in FIG. 10B, and calculates the differences between vertically adjacent odd field line signals and the differences between vertically adjacent even field line signals, and finds the sum of absolute values of the differences EFD, or the sum of squared values of the differences.

$$EFD = \sum_{j=1}^{16}\sum_{i=1}^{15} (|o(i,j) - o(i+1,j)| + |e(i,j) - e(i+1,j)|) \quad \text{Eqn. 2}$$

The DCT switching circuit 55 compares the difference between the frame-based and field-based sums of the absolute values with a predetermined threshold and selects frame-based DCT transformation if the difference EFM–EFD is less than the predetermined threshold.

If the frame predictive mode is selected in the predictive judging circuit 54, the probability is high that the frame DCT mode will be selected in the DCT mode switching circuit 55. If the field predictive mode is selected in the predictive judging circuit 54, the probability is high that the field DCT mode will be selected in the DCT mode switching circuit 55. However, since this is not necessarily the case, the predictive judging circuit 54 sets the mode which will give the least value of the sum of the absolute values of predictive errors, while the DCT mode switching circuit 55 sets the mode which will give the optimum orthogonal transformation encoding efficiency.

If frame-based orthogonal transformation mode, also referred to as frame DCT mode, is selected, the DCT mode switching circuit 55 functions to ensure that the four luminance blocks Y1 to Y4 and two color difference blocks Cb, Cr represent alternating or interlaced odd and even field lines, as shown in FIG. 10A.

If a field-based orthogonal transformation mode, also referred to as field DCT mode, is selected, the DCT mode switching circuit 55 functions to ensure that each of the luminance blocks represents only one field, and that each of the color difference blocks has segregated or non-interlaced odd and even field lines, as shown in FIG. 10B.

The DCT mode switching circuit 55 functions to output the data having the configuration associated with the selected DCT mode, and to output a DCT flag indicating the selected DCT mode to the variable length coding circuit 58 and the motion compensation circuit 64.

FIG. 11 shows an example of a configuration of the DCT mode switching circuit 55. The subtractor elements 160 calculate the differences between respective pixels of vertically adjacent odd and even field line signals of interlaced macro-block (a). The squaring circuits 161 square the respective differences and supply the squared respective differences to the adder 162 where the sum of the squared differences, EFM, is determined. The adder 162 supplies the sum EFM to the comparator 165.

Similarly, the subtractors 170 calculate the differences between pixels of vertically adjacent odd field line signals and calculate the differences between pixels of vertically adjacent even field line signals of the macro-block, as shown in a field-based configuration (b). The squaring circuits 171 square the respective differences and the adder 172 calculates the sum of the squared differences, EFM, and supplies the sum EFM to the comparator 165.

The comparator 165 compares the difference between the sum EFD and the sum EFM with a predetermined threshold value and selects one from the frame DCT mode or the field DCT mode accordingly.

Referring back to FIG. 8, the DCT mode switching circuit 55 supplies appropriately configured difference picture data to a DCT circuit 56 which is operative to orthogonally transform it using a discrete cosine transformation into DCT coefficients, and to supply the DCT coefficient data to a quantization circuit (quantizer) 57 that functions to quantize the coefficient data with quantization steps selected in accordance with the volume of data stored in a transmission buffer 59 and to supply quantized data to a variable length coding circuit 58.

The variable length coding circuit 58 is also supplied with the quantization step or scale data from the quantizer 57, predictive mode data from the predictive judging circuit 54, that is data indicating which of the intra-picture prediction, forward prediction, backward prediction or bi-directional prediction is used, and motion vector data from the motion vector detector 50. The coding circuit 58 also receives prediction flag data from the predictive judging circuit 54 comprising a flag indicating which of the frame predictive mode or the field predictive mode is used, and prediction flag data from the DCT mode switching circuit 55 comprising a flag indicating which of the frame DCT mode or the field DCT mode is used. This information is placed into the header portion of the encoded data stream.

The variable length coding circuit 58 serves to encode the quantized data and the header information using a variable length code such as a Huffman code, in accordance with the quantization step data supplied from the quantizer 57, and to output the resulting data to the transmission buffer 59.

The quantized data and quantization step are also supplied to an inverse quantization (inverse quantizer) circuit 60 which serves to dequantize the quantized data using the quantization step, and to supply the recovered DCT coefficient data to an inverse DCT circuit 61 that functions to inverse transform the DCT coefficient data to produce recovered difference data and to supply the recovered difference data to an arithmetic unit 62.

The arithmetic unit 62 combines the recovered difference data with a previously encoded and decoded reference picture, as motion compensated, to produce decoded data for a reconstructed picture which will be used as a reference picture and which is read into one of two frame memories 63a, 63b. The memories 63a, 63b are adapted to read out the reference picture data stored therein to a motion compensation circuit 64 that uses the motion vectors from the motion vector detector 50 to produce a predictive picture from the reference picture. Specifically, the circuit 64 uses the motion vector to alter the readout address of the reference picture from the memory 63a or 63b.

For a group of pictures, after the first frame I-picture data and the third frame P-picture data are stored in the forward and backward prediction picture memories or units 63a, 63b, respectively, the second frame B-picture data is processed by the motion vector detector 50. The predictive judging circuit 54 selects the frame or field predictive mode, while setting the predictive mode to one of intra-frame predictive mode, forward predictive mode, backward predictive mode or bi-directional predictive mode in correspondence with the sum of absolute values of predictive errors by macro-block.

Since a reconstructed B-picture is not used as a reference picture for other pictures, it is not stored in the frame memory 63.

It will be appreciated that the frame memory 63 has its forward and backward predictive picture units 63a, 63b bank-exchanged as needed so that a picture stored in one of the units 63a or 63b can be outputted as either a forward or a backward predictive picture.

The motion compensation circuit 64 functions to supply the motion compensated data as a predictive picture to the arithmetic unit 62 and to the arithmetic unit 53 which subtracts the predictive picture from the P-picture or the B-picture currently being predictively encoded.

More specifically, when the motion vector detector 50 receives picture data for an I-picture from the forward original picture unit 51a, the predictive judging circuit 54 selects the intra-frame predictive mode and sets a switch 53d of the arithmetic unit 53 to an input contact a. This causes the I-picture data to be inputted directly to the DCT mode switching circuit 55. In this case, no predictive picture is expected from the motion compensation circuit 64. The I-picture data is also supplied to the forward predictive picture memory unit 63a.

When the forward predictive mode is selected by the predictive judging circuit 54, the circuit 54 sets the switch 53d to an input contact b which causes the arithmetic unit 53a to subtract the predictive picture, produced by the motion compensation circuit 64, from the picture read out from the memory 51, for each macro-block on a pixel by pixel basis, to produce difference data. The P-picture, after encoding and local decoding, is supplied to one of the memory units 63a, 63b. For example, if the P-picture immediately follows an I-picture, then the P-picture is stored in the backward predictive picture memory unit 63b.

For forward predictive encoding, the predictive picture is a reference I-picture or P-picture read out from the forward predictive picture unit 63a of the frame memory 63 and motion-compensated by the motion compensation circuit 64 in accordance with the motion vector outputted from the motion vector detector 50. More specifically, for each macro-block, the motion compensation circuit 64 shifts the readout address of the forward predictive picture memory unit 63a in an amount corresponding to the motion vector currently output by the motion vector detector 50.

When the backward predictive mode is selected by the predictive judging circuit 54, the circuit 54 sets the switch 53d to an input contact c which causes the arithmetic unit 53b to subtract the predictive picture, produced by the motion compensation circuit 64, from the picture read out from the memory 51, on a pixel by pixel basis, to produce difference data.

For backward predictive encoding, the predictive picture is a P-picture read out from the backward predictive picture unit 63b of the frame memory 63 and motion-compensated by the motion compensation circuit 64 in accordance with the motion vector outputted from the motion vector detector 50. More specifically, for each macro-block, the motion compensation circuit 64 shifts the readout address of the backward predictive picture memory unit 63b in an amount corresponding to the motion vector currently output by the motion vector detector 50.

When the bi-directional predictive mode is selected by the predictive judging circuit 54, the circuit 54 sets the switch 53d to an input contact d which causes the arithmetic unit 53c to subtract a predictive picture from the picture read out from the memory 51, on a pixel by pixel basis, to produce difference data. The predictive picture is the mean value of a forward predictive picture and a backward predictive picture.

In the case of bi-directional prediction, the picture stored in the forward predictive picture memory unit 63a, and the picture stored in the backward predictive picture memory unit 63b, are read out and motion-compensated by the motion compensation circuit 64 in dependence upon the motion vectors outputted from the motion vector detector 50. More specifically, for each macro-block, the motion compensation circuit 64 shifts the readout address of the forward and backward predictive picture memory units 63a, 63b in an amount corresponding to the appropriate one of the motion vectors currently output by the motion vector detector 50.

The transmission buffer 59 temporarily stores the data supplied thereto, generates control data indicating the volume of data stored therein and supplies the control data to the quantizer 57. When the volume of data stored in the transmission buffer 59 reaches a predetermined upper limit value, the control data from the transmission buffer 59 causes the quantization scale of the quantizer 57 to increase so as to decrease the volume of the quantized data. Similarly, when the volume of data stored in the transmission buffer 59 reaches a predetermined lower limit value, the control data from the transmission buffer 59 causes the quantization scale of the quantizer 57 to decrease so as to increase the volume of the quantized data. In this manner, the transmission buffer 59 prevents the data supplied thereto from overflowing or underflowing its capacity. The data stored in the transmission buffer 59 are read out at a predetermined timing to an output terminal 69 and thence to a transmission channel for recording on, for example, the recording medium 3.

Although the foregoing description has been made with reference mainly to the luminance blocks, the color difference blocks are similarly processed and transmitted using the motion vector which corresponds to the motion vector of the luminance block halved in both the vertical and horizontal directions.

FIG. 12 illustrates the decoder 31 shown in FIG. 6. The reproduced encoded picture data transmitted from the recording medium 3 is applied to a reception circuit, not shown, or to an input terminal 80 which applies the encoded picture data to a receiving buffer 81 that serves to temporarily store the encoded picture data and to supply this data to a variable length decoding circuit 82 of a decoding circuit 90.

The variable length decoding circuit 82 functions to variable length decode the encoded data, to output the recovered motion vector, predictive mode data, prediction flags and DCT flags to the motion compensation circuit 87, and to output the quantization step data and variable length decoded picture data, including the predictive mode, the motion vector, the predictive flag, the DCT flag and the quantized picture data for each macro-block, to an inverse quantizer 83.

The inverse quantizer 83 is adapted to dequantize the picture data supplied from the variable length decoding circuit 82 in accordance with the quantization step data supplied from the variable length decoding circuit 82 and to output the thus recovered coefficient data to an inverse transformation IDCT circuit 84.

The IDCT circuit 84 is adapted to perform an inverse transformation on the recovered coefficient data to produce recovered difference data, and to supply the recovered difference data to an arithmetic unit 85.

If the recovered difference data supplied from the IDCT circuit 84 represents a macro-block of an I-picture, the arithmetic unit 85 does not process the data and simply supplies it through an output terminal 91 to the format converter 32 shown in FIG. 6, and to a forward predictive picture unit 86a of a frame memory 86.

If the recovered difference data supplied from the IDCT circuit 84 represents a macro-block of a P-picture produced in the forward predictive mode, then the reference picture data of the preceding frame, as stored in the forward predictive picture memory 86a of the frame memory 86, is read and motion-compensated by a motion compensation circuit 87 in dependence upon the motion vector outputted from the variable length decoding circuit 82 to generate a prediction picture. Specifically, the motion compensation circuit 87 uses the motion vector to alter the read out address supplied to the memory 86a. The arithmetic unit 85 adds the predictive picture to the recovered difference data to produce a decoded or reconstructed picture which is stored in a backward predictive picture memory 86b of the frame memory 86. The decoded P-picture is retained in the decoder 31, and output after the next B-picture is decoded and output, so as to restore the pictures to the order in which they were supplied to the encoder 18 of FIG. 6.

Even if the macro-block of the P-picture was encoded as intra-coded data, the decoded P-picture is directly stored in the backward predictive picture memory unit 86b, without being output to the output terminal 91 by the arithmetic unit 85.

If the recovered difference data supplied from the IDCT circuit 84 represents a macro-block of a B-picture encoded in the intra-coding mode, as determined from the predictive mode supplied from the variable length decoding circuit 82 to the motion compensation circuit 87, a predictive picture is not generated therefrom.

If the recovered difference data supplied from the IDCT circuit 84 represents a macro-block of a B-picture encoded in the forward predictive mode, as determined from the predictive mode supplied from the variable length decoding circuit 82 to the motion compensation circuit 87, the data stored in the forward predictive picture unit 86a of the frame memory 86 is read out and motion compensated by the motion compensation circuit 87 using the motion vector supplied from the variable length decoding circuit 82 to form the predictive picture. The arithmetic unit 85 sums the recovered difference data with the predictive picture to form the recovered B-picture.

If the recovered difference data supplied from the IDCT circuit 84 represents a macro-block of a B-picture encoded in the backward predictive mode, as determined from the predictive mode supplied from the variable length decoding circuit 82 to the motion compensation circuit 87, the data stored in the backward predictive picture unit 86b is read out and motion compensated by the motion compensation circuit 87 using the motion vector supplied from the variable length decoding circuit 82 to form the predictive picture. The arithmetic unit 85 sums the recovered difference data with the predictive picture to form the recovered B-picture.

If the recovered difference data supplied from the IDCT circuit 84 represents a macro-block of a B-picture encoded in the bi-directional predictive mode, as determined from the predictive mode supplied from the variable length decoding circuit 82 to the motion compensation circuit 87, the data stored in both the forward and backward predictive picture memories 86a, 86b are read out and respectively motion compensated by the motion compensation circuit 87 using the motion vectors supplied from the variable length decoding circuit 82, then averaged to form the predictive picture. The arithmetic unit 85 sums the recovered difference data with the predictive picture to form the recovered B-picture.

The recovered B-picture is supplied via the output terminal 91 to the format converter 32. However, since the B-picture is not utilized for generating a predictive picture for other pictures, it is not stored in the frame memory 86.

After outputting of the B-picture, picture data of the P-picture stored in the backward predictive picture unit 86b is read and supplied via the motion compensation circuit 87 to the arithmetic unit 85. Motion compensation is not performed at this time.

The counterpart circuits to the predictive mode switching circuit 52 and the DCT mode switching circuit 55 in the encoder 18 of FIG. 8 are not shown in the decoder 31. The processing to be performed by these circuits, that is, the processing for restoring the configuration in which odd-field line signals and even-field line signals are separated from each other to the configuration in which odd and even-field line signals alternate with each other, is performed by the motion compensation circuit 87.

The processing of the luminance signals has been explained in the foregoing. As will be appreciated by one of ordinary skill in the art, the processing of the color difference signals is carried out in a similar manner. However, the motion vector employed in such case is the motion vector for luminance signals which is halved in both the vertical and horizontal directions.

The conventional encoding and decoding methods for picture signals described above, have the drawback that the differences EFM and EFD, which are used to select either the frame-based DCT mode or the field-based DCT mode, do not necessarily predict the orthogonal transformation mode having the greater efficiency.

A further drawback of the above-described conventional encoding methods is that because selection from one of intra-picture prediction, forward inter-picture prediction, backward inter-picture prediction or bi-directional inter-picture prediction is made using predictive error signals that are not a function of the DCT coefficients, the choice of picture prediction does not necessarily result in the most efficient orthogonal transformation of the predictive picture.

OBJECTS AND SUMMARY OF THE INVENTION

Therefore, an object of the present invention is to provide a method and apparatus for encoding picture signals which avoids the aforementioned disadvantages of the related art.

Another object of the present invention is to provide a method and apparatus for encoding picture signals in which the most efficient of either frame-based transformation or field-based transformation is selected.

A further object of the present invention is to provide a method and apparatus for encoding picture signals in which either frame-based orthogonal transformation or field-based orthogonal transformation is selected using DCT coefficients.

An additional object of the present invention is to provide a method and apparatus for encoding picture signals in which the most efficient of intra-picture prediction, forward inter-picture prediction, backward inter-picture prediction or hi-directional inter-picture prediction is selected.

A still further object of the present invention is to provide an encoding method and apparatus for picture signals in which DCT coefficients are used to select the most efficient mode of picture prediction.

In accordance with an aspect of this invention, a method of and apparatus for encoding picture signals arranges picture signal data into frame-formatted blocks in which odd field data alternates with even field data. The frame-formatted blocks are orthogonally transformed to form frame-based coefficient data. The picture signal data is also arranged into field-formatted blocks of either odd field data or even field data, and the field-formatted blocks are orthogonally transformed to form field-based coefficient data. The most efficient of the two modes of orthogonal transformation is then selected by selecting from either the frame-based coefficient data or the field-based coefficient data, the data having the smallest quantity of coefficient data. The selected data is then encoded for transmission.

As another aspect of the present invention, a method of and apparatus for encoding picture signals arrange picture signal data into frame-formatted blocks in which odd field data alternates with even field data. The frame-formatted blocks are orthogonally transformed to form arrays of frame-based coefficients in which each respective array corresponds to one of the frame formatted blocks. The respective magnitudes of the elements of at least a portion of each array of frame-based coefficients are determined and are combined to form a frame-based sum. The picture signal data is also arranged into field-formatted blocks in which each field-formatted block comprises either odd field data or even field data. The field-formatted blocks are orthogonally transformed to form arrays of field-based coefficients such that each respective array corresponds to one of the field-formatted blocks. The respective magnitudes of the elements of at least a portion of each array of field-based coefficients are determined and are combined to form a field-based sum. From the arrays of frame-based coefficients and the arrays of field-based coefficients, the arrays exhibited by the smallest quantity of data are selected as a function of the frame-based sum and the field-based sum. The selected arrays are encoded for transmission.

In accordance with a further aspect of the present invention, a method and apparatus for encoding picture signals arranges picture signal data into intra-coded frame-formatted blocks and into inter-coded frame-formatted blocks such that each of these blocks has odd field data which alternates with even field data. The intra-coded and inter-coded frame-formatted blocks are orthogonally transformed into intra-coded frame-based coefficient data and into inter-coded frame-based coefficient data, respectively. The picture signal data is also arranged into intra-coded field-formatted blocks and into inter-coded field-formatted blocks such that each block comprises either the odd field data or the even field data. The intra-coded and inter-coded field-formatted blocks are orthogonally transformed into intra-coded field-based coefficient data and inter-coded field-based coefficient data, respectively. The coefficient data having the smallest quantity of data is selected and encoded for transmission.

In accordance with this aspect of the invention, the coefficient data having the smallest quantity of data may be selected by selecting one of the intra-coded frame-based coefficient data and the intra-coded field-based coefficient data having the smaller quantity of coefficient data; selecting one of the inter-coded frame-based coefficient data and the inter-coded field-based coefficient data having the smaller quantity of coefficient data; and then selecting from the selected ones, the one having the smaller quantity of coefficient data.

As a still further aspect of the present invention, a method and apparatus for encoding picture signals arranges picture signal data into intra-coded frame-formatted blocks and inter-coded frame-formatted blocks in which odd field data alternates with even field data. The intra-coded frame-formatted blocks and the inter-coded frame-formatted blocks are orthogonally transformed to respectively form arrays of intra-coded frame-based coefficients and inter-coded frame-based coefficients. The respective magnitudes of at least a portion of each array of the intra-coded frame-based coefficients and the inter-coded frame-based coefficients are respectively combined to form an intra-coded frame-based sum and an inter-coded frame-based sum. The picture signal data are also arranged into intra-coded field-formatted blocks and inter-coded field-formatted blocks such that each block comprises either odd field data or even field data. The intra-coded field-formatted blocks and the inter-coded field-formatted blocks are orthoganally transformed to respectively form arrays of intra-coded field-based coefficients and inter-coded field-based coefficients. The respective magnitudes of at least a portion of each array of the intra-coded field-based coefficients and the inter-coded field-based coefficients are respectively combined to form an intra-coded field-based sum and an inter-coded field-based sum. The arrays exhibited by the smallest quantity of data are selected as a function of the intra-coded frame-based sum, the inter-coded frame-based sum, the intra-coded field-based sum and the inter-coded field-based sum; and the selected arrays are encoded for transmission.

In accordance with a feature of the above-mentioned aspects of the present invention, the orthogonal transformation may include a DCT transformation. Further, the magnitude of an element of an array is either its absolute value or the square of its value. Additionally, the frame-based and field-based sums may comprise only the high frequency coefficients, the AC coefficients, or may include all coefficients. Moreover, the one of the arrays of frame-based coefficients or field-based coefficients may be selected by comparing one of the respective sums to a predetermined threshold value or by comparing one of the respective sums with a second respective sum or with a weighted value of the second respective sum.

The above, and other objects, features and advantages of the present invention will be apparent from the following detailed description of the preferred embodiments of the present invention when read in conjunction with the accompanying drawings in which corresponding parts are identified by the same reference numeral.

BRIEF DESCRIPTION OF THE DRAWINGS

FIGS. 1A and 1B are pictures illustrating inter-frame correlation;

FIGS. 7A–7C are diagrams referred to in explaining the operation of the format converting circuit shown in FIG. 6;

FIG. 10A–10B are charts referred to in explaining the orthogonal transformation operation of the encoder shown in FIG. 8;

DETAILED DESCRIPTION OF THE PREFERRED EMBODIMENTS

The present invention encodes picture signals so that the most efficient of a frame-based and a field-based orthogonal transformation of picture signal data is selected using the frame-based and the field-based coefficient data to determine the one of the orthogonal transformations that provides the smallest quantity of coefficient data.

Figures 2A, 2B:
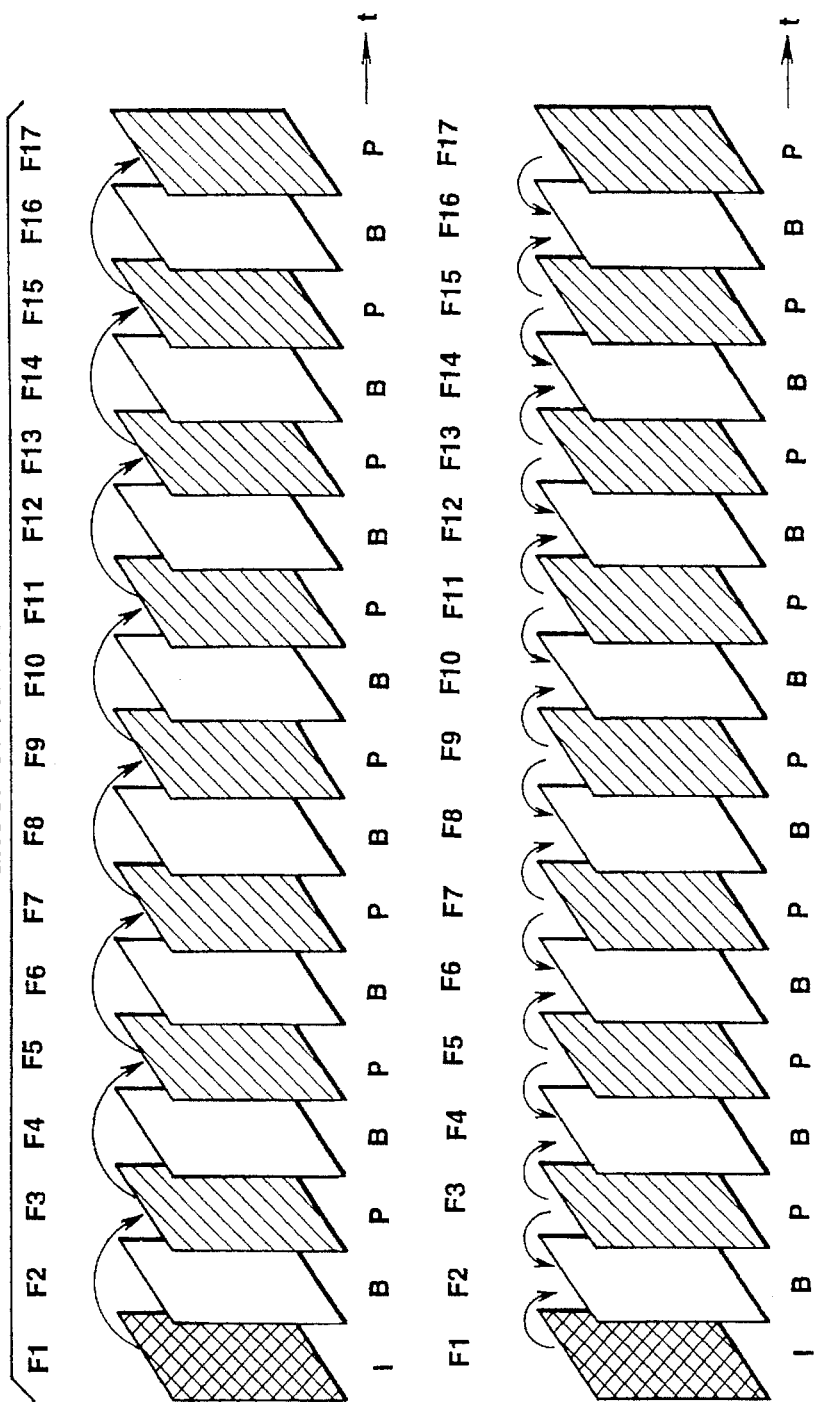
FIGS. 2A and 2B are diagrams illustrating types of pictures used in predictive encoding.
Figures 3A, 3B:
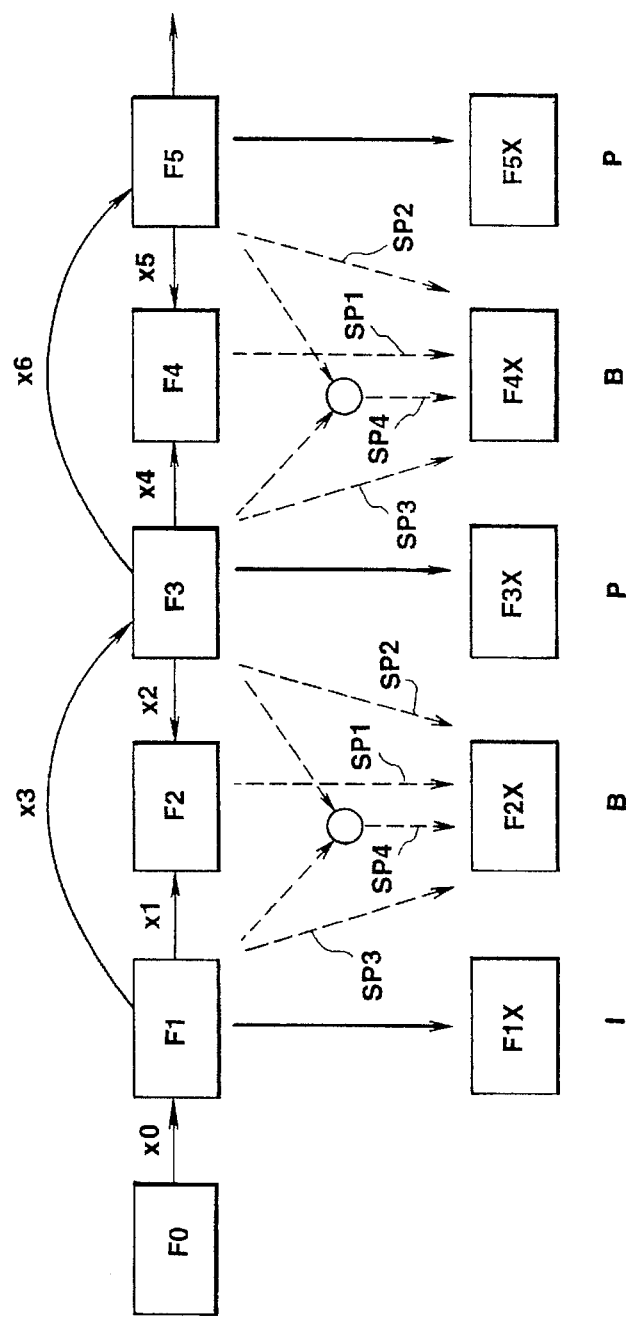
FIG. 3 is a diagram illustrating how picture signals are converted into encoded data for transmission.
Figure 4:
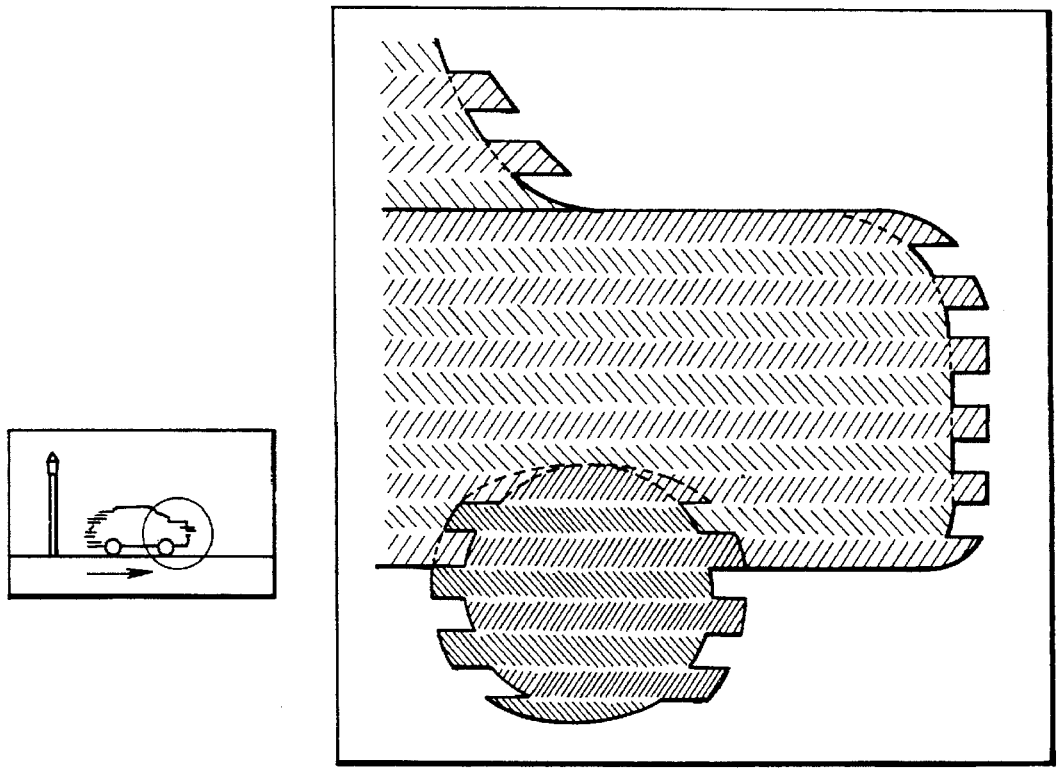
FIG. 4 is a diagram illustrating an object in motion.
Figure 5A:
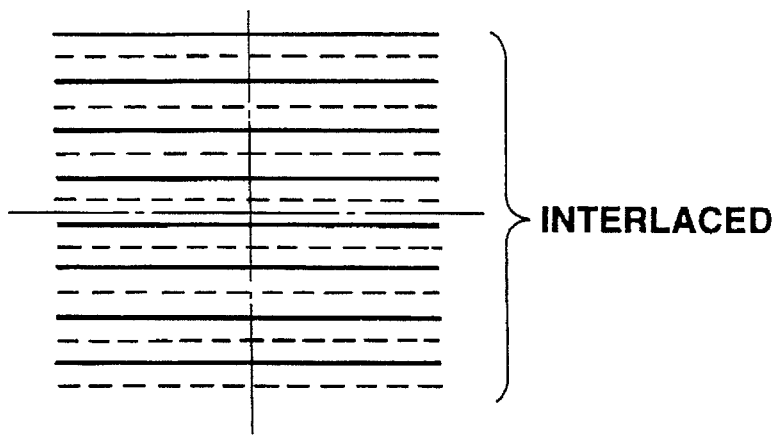
FIGS. 5A and 5B are diagrams respectively illustrating interlaced odd and even rows and segregated odd and even rows of a portion of a frame representing a picture.
Figure 5B:
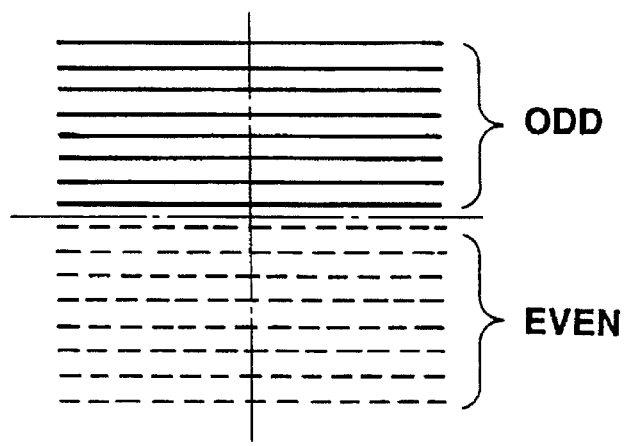
Figure 6:
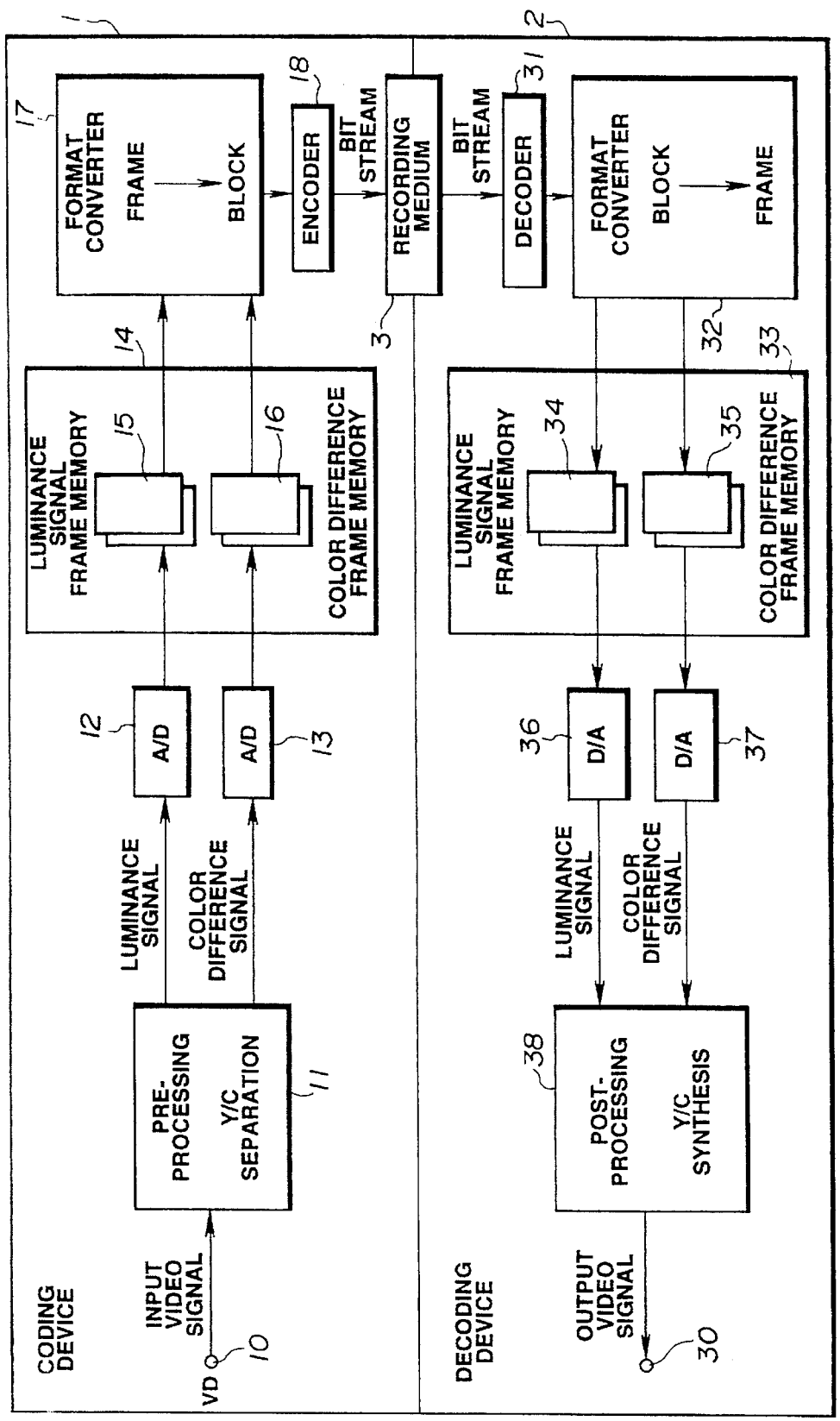
FIG. 6 is a block diagram showing a conventional device for encoding and decoding picture signals.
Figure 8:
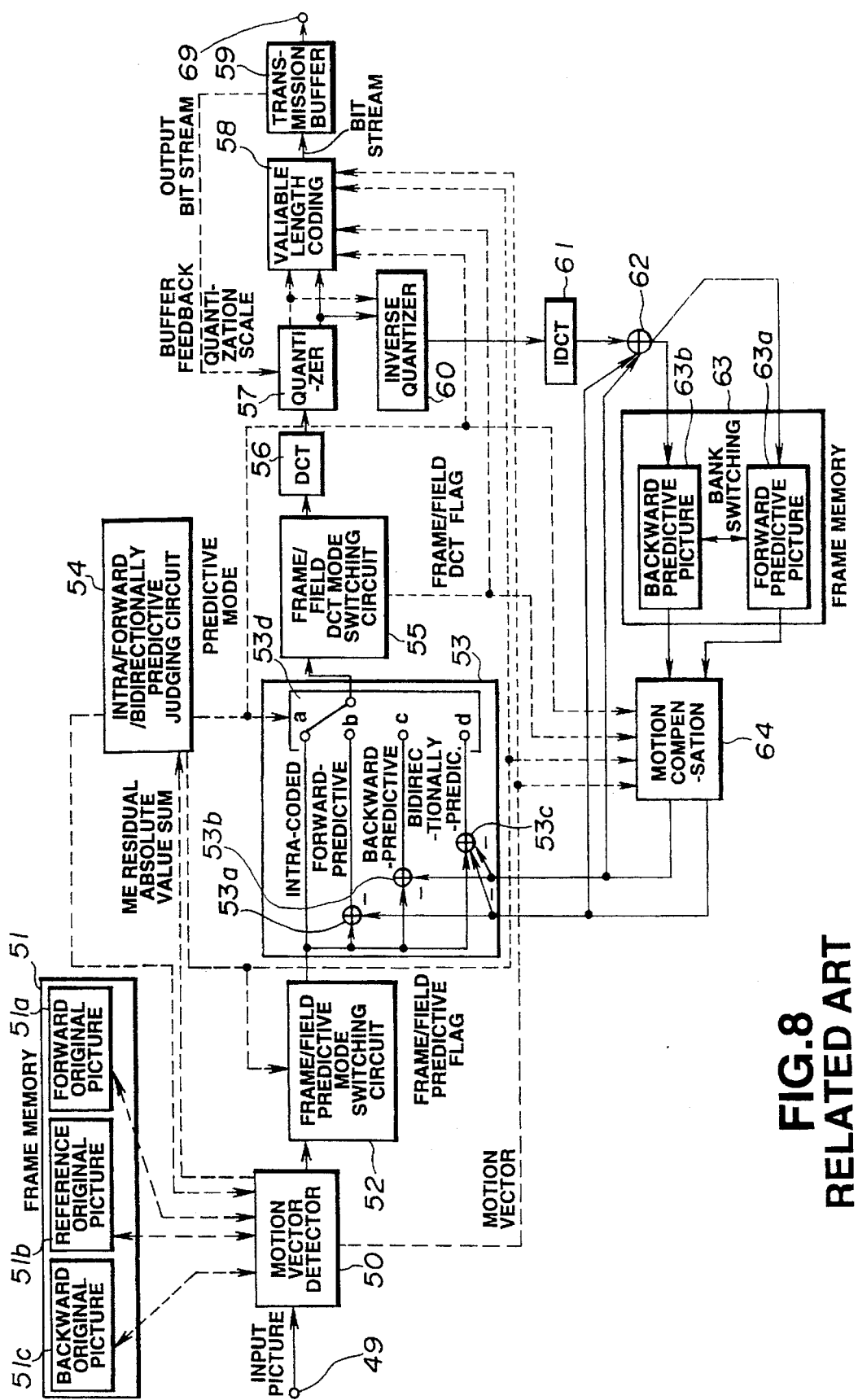
FIG. 8 is a block diagram showing the encoder of the device shown in FIG. 6.
Figures 9A, 9B:
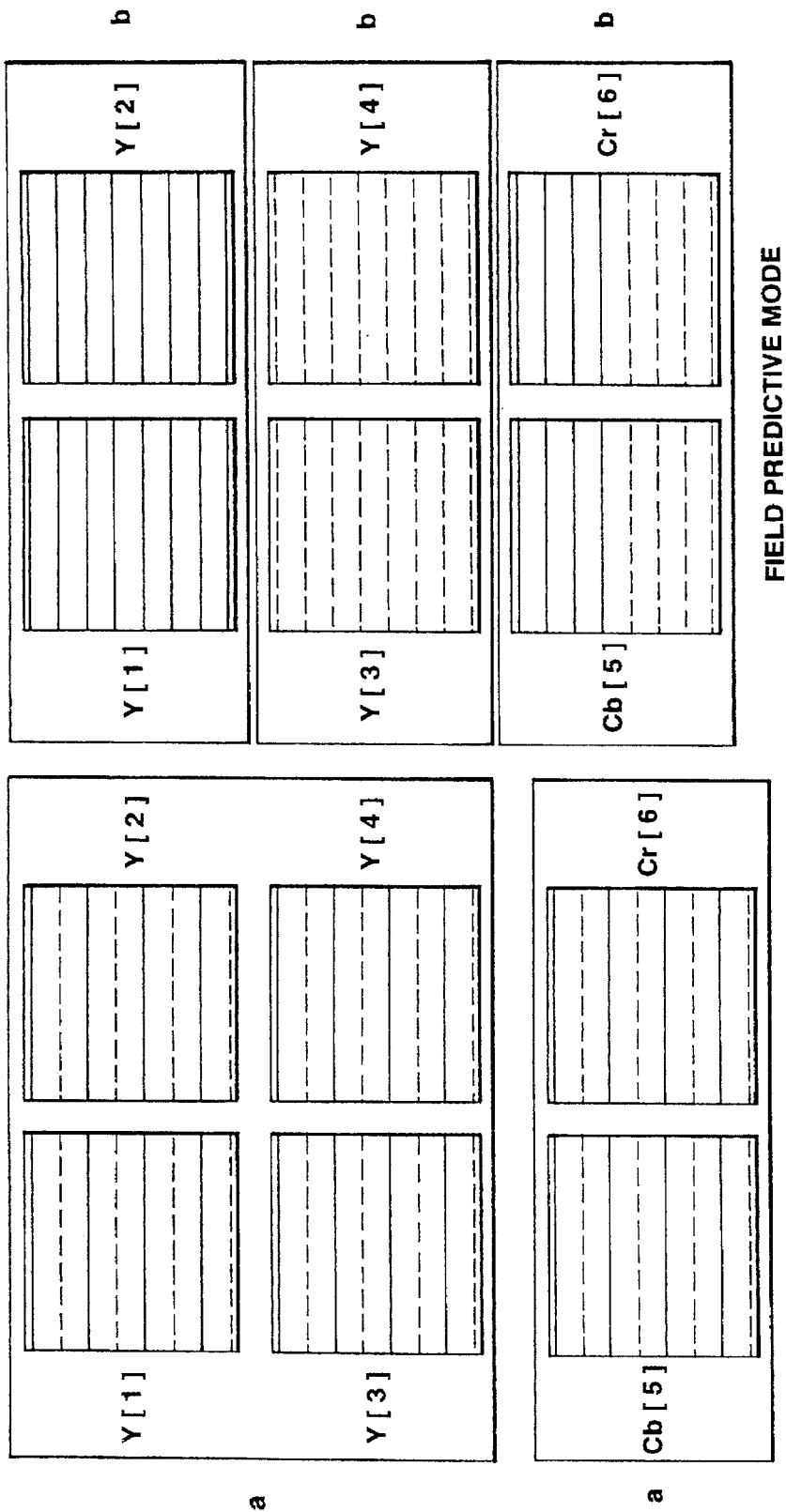
FIG. 9A–9B are charts referred to in explaining the predictive encoding operation of the encoder shown in FIG. 8.
Figure 11:
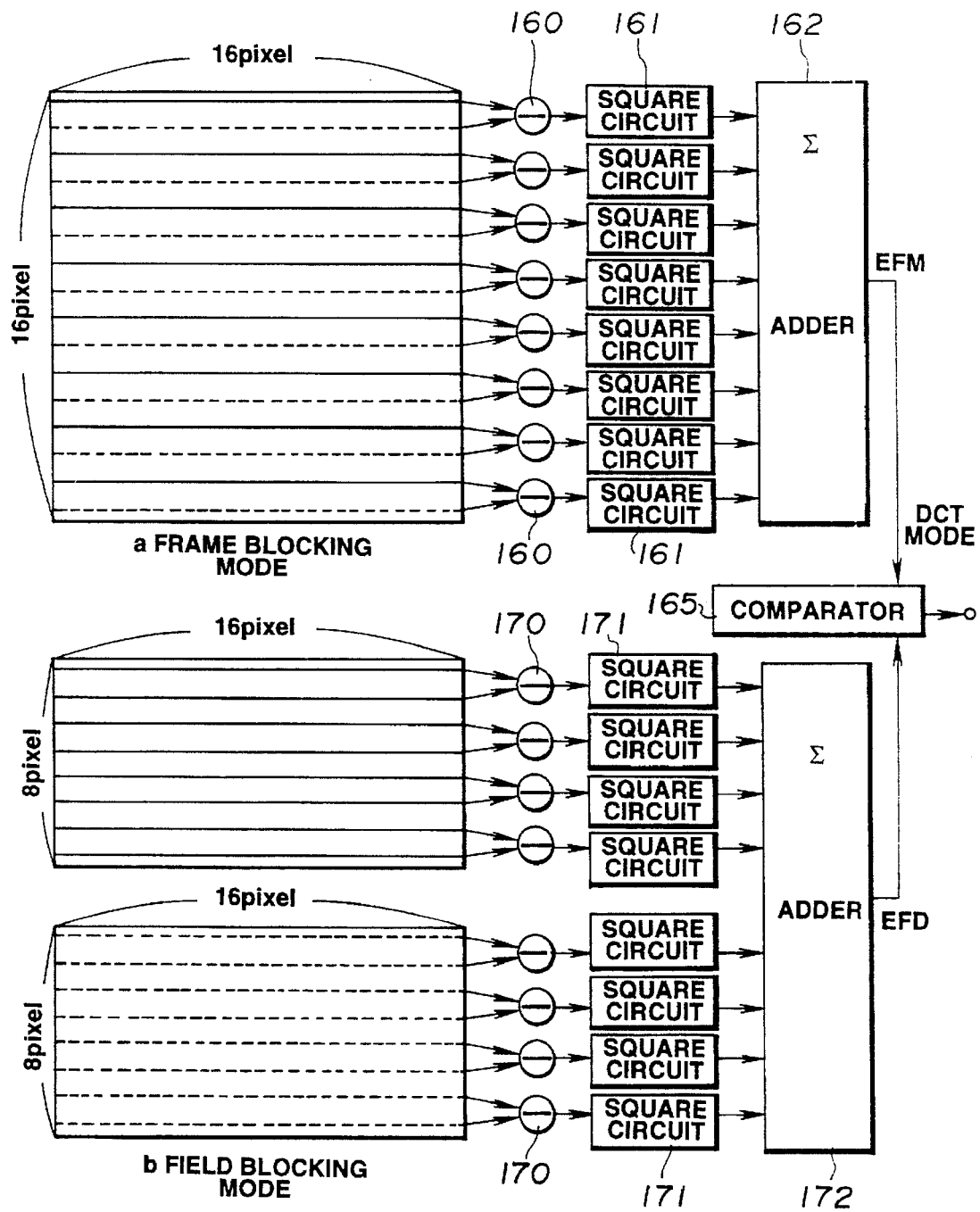
FIG. 11 is a block diagram showing a configuration of the DCT mode switching circuit of FIG. 8.
Figure 12:
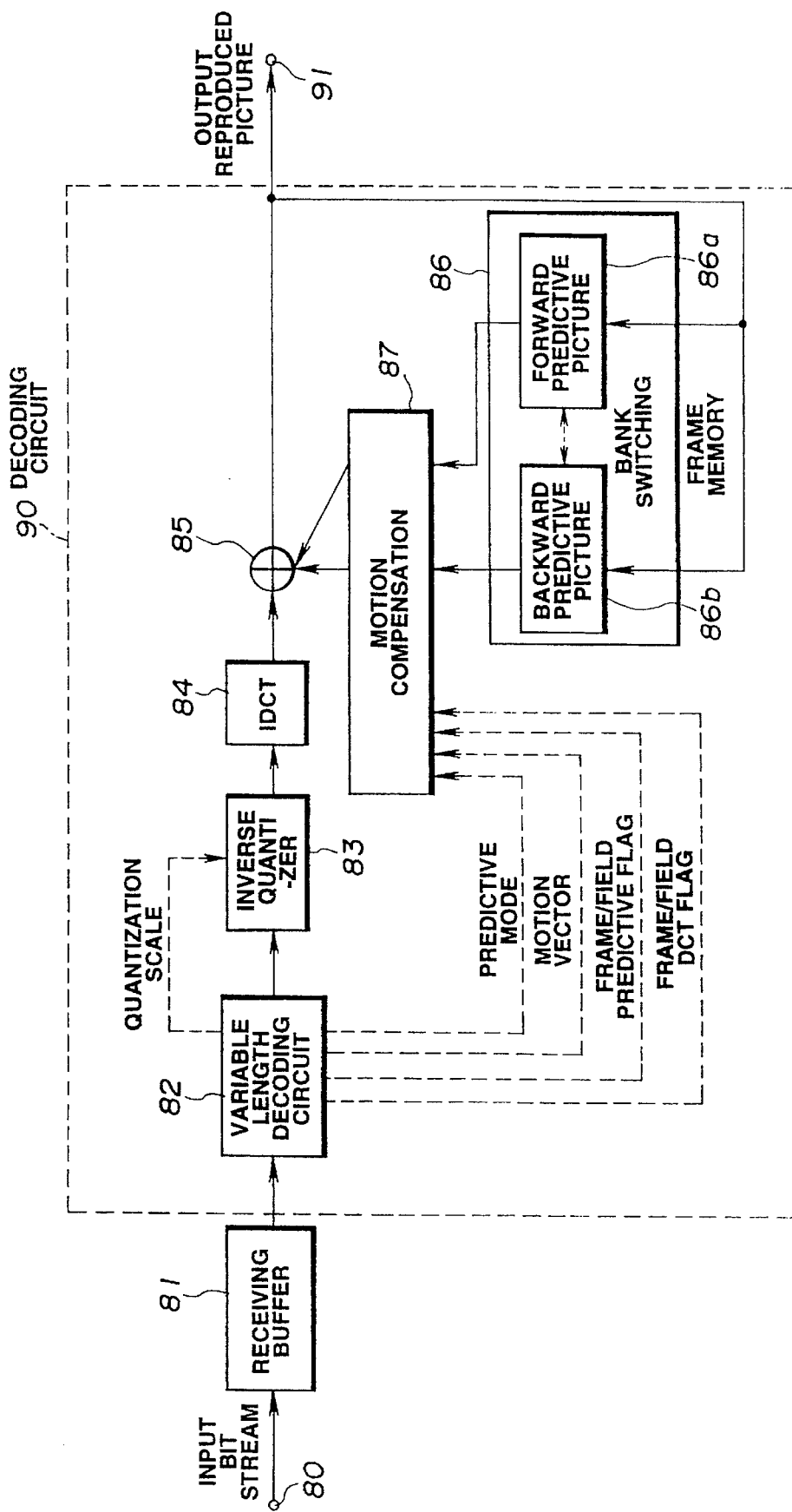
FIG. 12 is a block diagram showing the decoder of the device shown in FIG. 6.
Figure 13:
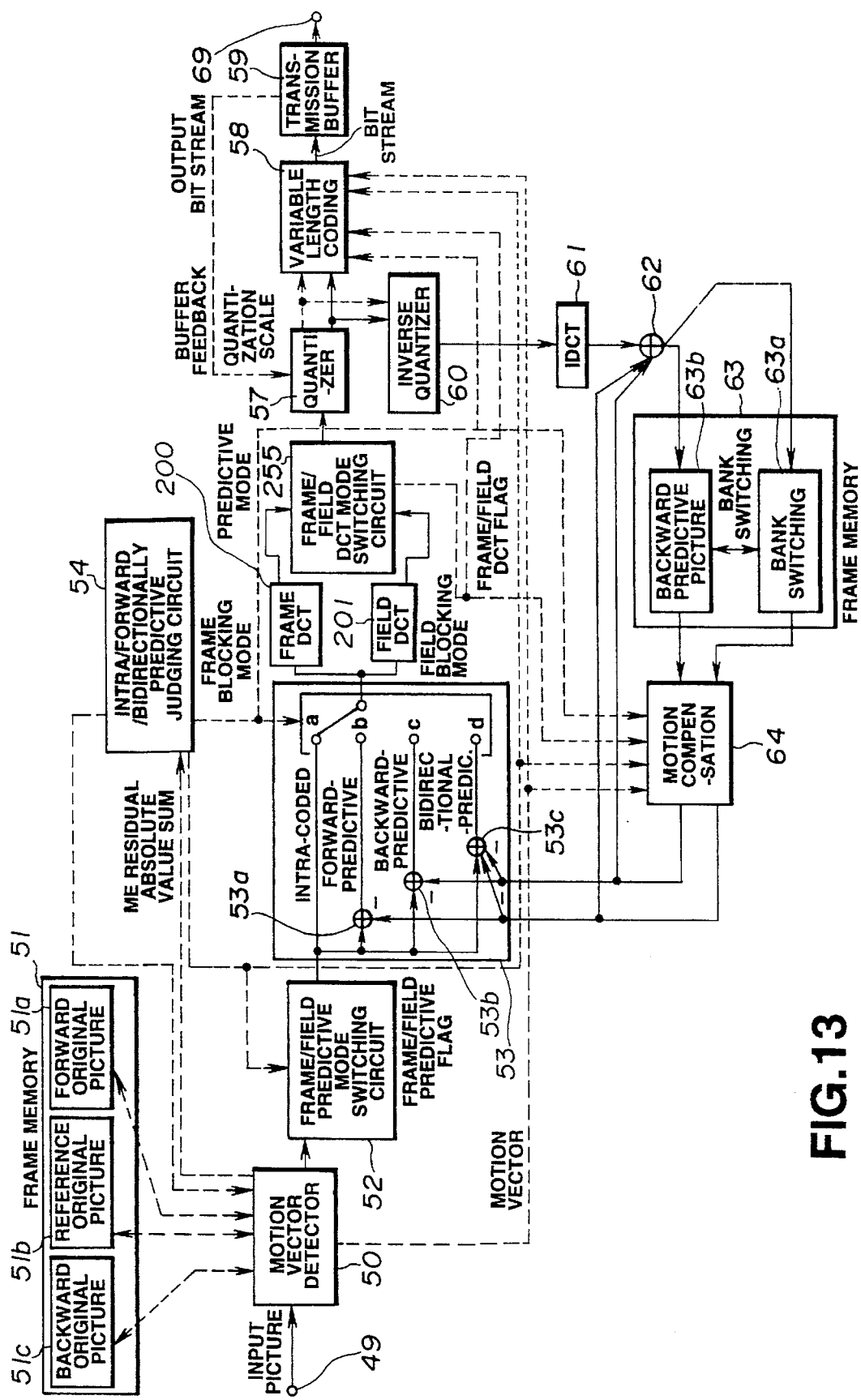
FIG. 13 is a block diagram showing an encoder according to a first embodiment of the present invention.

FIG. 13 is a block diagram of an encoder according to a first embodiment of the present invention. In FIG. 13, the elements identical to those shown in FIG. 8 are indicated by the same reference numerals and a description thereof is omitted.

The encoder shown in FIG. 13 includes a frame DCT circuit 200, adapted to perform frame-based orthogonal transformations of picture signal data, a field DCT circuit 201, adapted to perform field-based orthogonal transformations of picture signal data, and a frame/field DCT mode switching circuit 255, adapted to select the most efficiently coded of the coefficient data supplied from the frame DCT circuit 200 and from the field DCT circuit 201.

Picture signal data of the current picture, predictively encoded on a macro-block by macro-block basis by the arithmetic unit 53 and is operated on by frame DCT circuit 200 as if arranged into the frame-formatted blocks shown in FIG. 10A. The frame DCT circuit 200 orthogonally transforms each frame-formatted block, which comprises an 8×8 array of pixels, and forms an array of 64 frame-based DCT coefficients.

The predictively encoded picture signal data are likewise supplied on a macro-block by macro-block basis and are operated upon by field DCT circuit 201 as if arranged into field-formatted blocks shown in FIG. 10B. Each field-formatted block, comprised of an 8×8 array of pixels, is orthogonally transformed to form an array of 64 field-based DCT coefficients.

The DCT mode switching circuit 255 selects, for every macro-block, either the arrays of frame-based coefficients or the arrays of field-based coefficients and supplies the selected arrays to the quantizer 57 for further processing as described above with reference to FIG. 8.

The manner in which the frame/field DCT mode switching circuit 255 selects either the frame-based coefficients or the field-based coefficients will now be described.

In accordance with a first technique for determining the more efficient of a frame-based and field-based orthogonal transformations, the DCT mode switching circuit 255 calculates a sum of the absolute values for each of four arrays of 64 DCT coefficients that represent the four orthogonally transformed frame-formatted luminance blocks, shown by Y[1], Y[2], Y[3] or Y[4] of FIG. 10A. The DCT mode switching circuit 255 adds the four respective sums to calculate a Frame Weight, summarized in the following manner:

$$\text{Frame Weight} = \sum_{i=1}^{4} \sum_{j=1}^{64} |\text{Frame } DCT \text{ Coef}[i][j]| \qquad \text{Eqn. 3}$$

wherein j represents the index of the respective frame-based coefficient, i represents the index of the respective luminance blocks and FrameDCTCoef[i][j] represents the value of the frame-based coefficient.

The DCT mode switching circuit 255 likewise calculates a Field Weight in the following manner:

$$\text{Field Weight} = \sum_{i=1}^{4} \sum_{j=1}^{64} |\text{Field } DCT \text{ Coef}[i][j]| \qquad \text{Eqn. 4}$$

wherein j represents the index of the respective field-based coefficient, i represents the index of the respective luminance blocks (shown by Y[1], Y[2], Y[3] and Y[4] of FIG. 10B), and FieldDCTCoef[i][j] represents the value of the field-based coefficient.

Alternatively, the sum of the squares of the respective DCT coefficients is calculated instead of the sum of the absolute values. Furthermore, the Frame Weight and the Field Weight may include the sums of the absolute values or the sums of the squares of the two arrays of DCT coefficients representing the two color difference blocks, shown respectively by Cb[5] and Cr[6] of FIGS. 10A and 10B.

The DCT mode switching circuit 255 compares the Frame Weight to a predetermined threshold value ($TH_1$). If the Frame Weight is of lesser value than $TH_1$, the frame-based orthogonal transformation is determined to be the more efficient orthogonal transformation, and the DCT mode switching circuit 255 supplies the frame-based coefficients to quantizer 57.

If the Frame Weight is of equal or greater value than $TH_1$, the Frame Weight is compared to the Field Weight. If the Frame Weight is of lesser value than the Field Weight, the frame-based orthogonal transformation is determined to be the more efficient orthogonal transformation, and the frame-based coefficients are supplied to quantizer 57. Conversely, if the Field Weight is of lesser value than the Frame Weight, the field-based orthogonal transformation is determined to be the more efficient orthogonal transformation, and the field-based coefficients are supplied.

Alternatively, the Frame Weight is compared to the Field Weight using weighted values. As an example, if the relation:

$$\text{Frame Weight} < (\text{Field Weight} * \beta_1) + \alpha_1,$$

is true, the frame-based orthogonal transformation is the more efficient transformation and the frame-based coefficients are selected; if the relation is not true, the field-based coefficients are selected. In this example, $\alpha_1$ and $\beta_1$ represent predetermined weighting values which are determined empirically.

In accordance with a second technique for determining the more efficient of a frame-based orthogonal transformation and a field-based orthogonal transformation, the DCT mode switching circuit 255 calculates the Frame Weight and the Field Weight in the above manner but with only a portion of each array of the 64 frame-based coefficients and only a portion of each array of the 64 field-based coefficients. As an example, because the magnitudes of the frame-based coefficients representing higher frequencies are more greatly influenced by the amount of motion contained in the current picture than the magnitudes of the field-based coefficients representing these higher frequencies, the DCT mode switching circuit 255 may calculate the Frame Weight and Field Weight using only these higher frequency coefficients.

In this second technique, the DCT mode switching circuit 255 compares the Frame Weight to the Field Weight and, if the Frame Weight is the lesser value, the frame-based coefficients are selected and supplied to quantizer 57. Conversely, if the Field Weight is the lesser value, the field-based coefficients are selected and supplied to quantizer 57.

Alternatively, the Frame Weight is compared to the Field Weight using weighted values. As an example, if the relation:

$$\text{Frame Weight} < (\text{Field Weigh} * \beta_2) + \alpha_2,$$

is true, the frame-based coefficients are selected; if the relation is not true, the field-based coefficients are selected. In this example, $\alpha_2$ and $\beta_2$ represent predetermined weighting values which are determined empirically.

Figure 14:
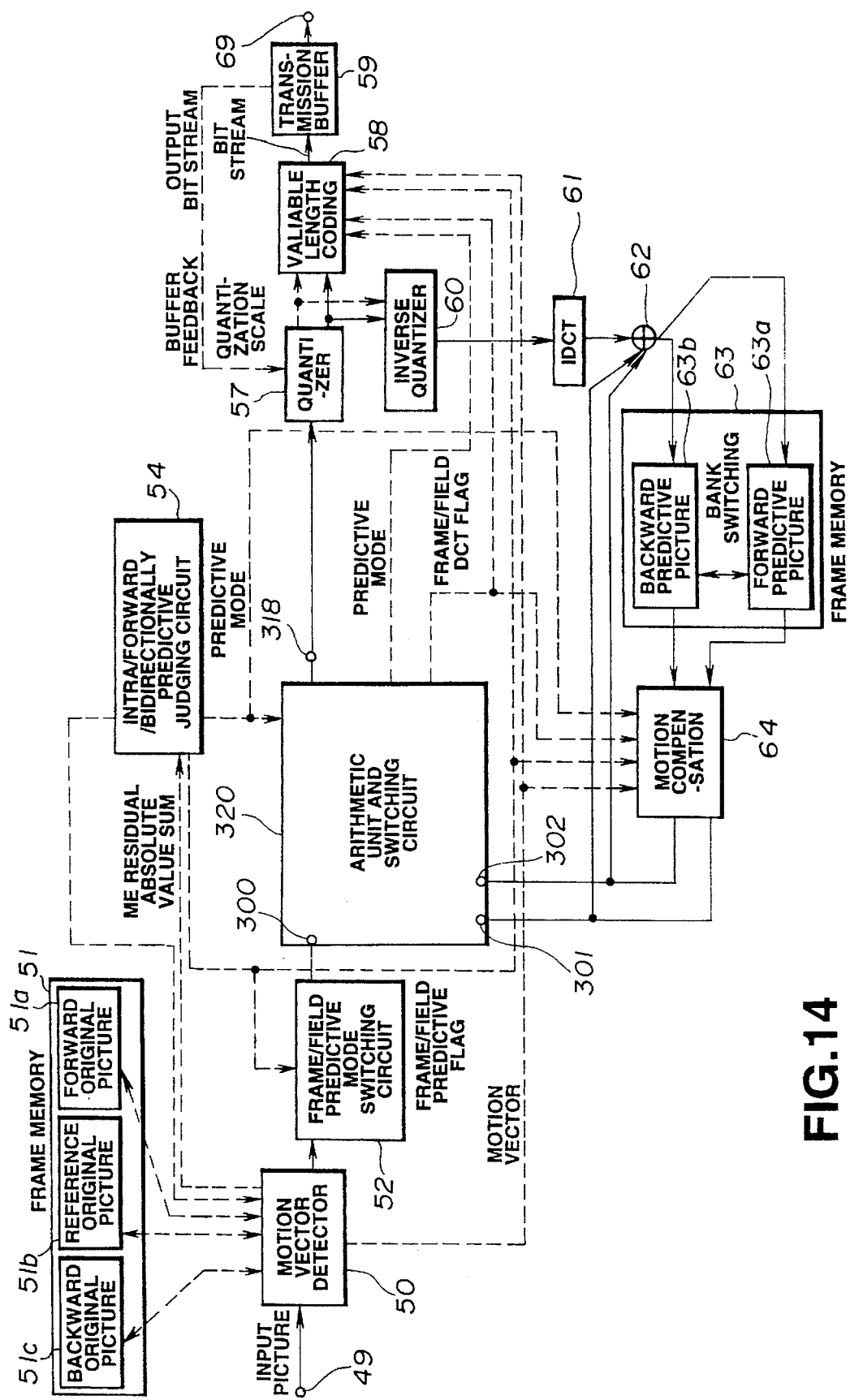
FIG. 14 is a block diagram showing an encoder according to a second embodiment of the present invention.

FIG. 14 is a block diagram of an encoder according to a second embodiment of the present invention. In this second embodiment, selection of either intra-coding or inter-coding, as well as selection of either a frame-based or a field-based orthogonal transformation, is performed as a function of the respective DCT coefficients having the smallest quantity of coefficient data.

Figure 15:
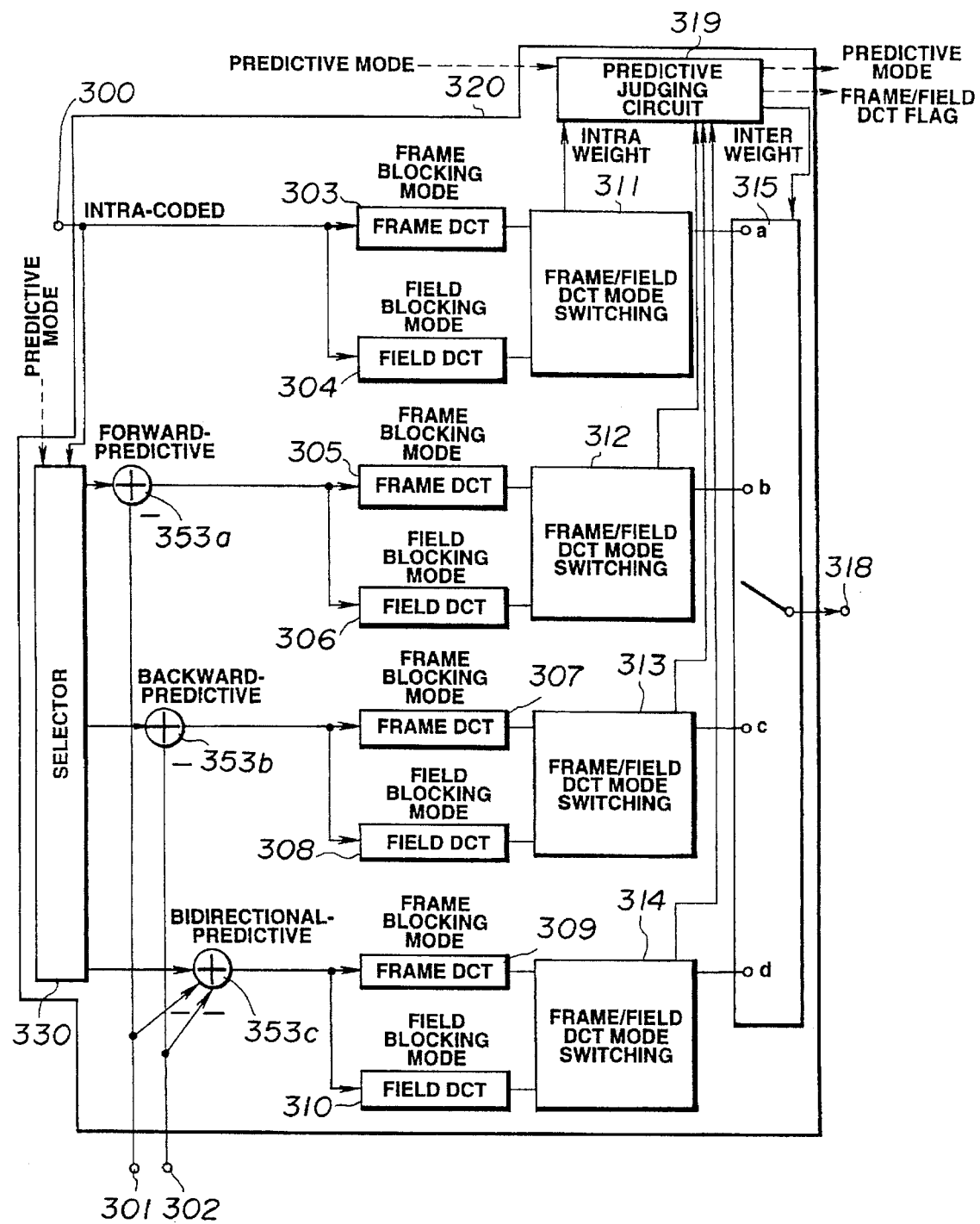
FIG. 15 is a block diagram showing a portion of the encoder shown in FIG. 14.

The encoder shown in FIG. 14 includes arithmetic unit and switching circuit 320, shown in detail in FIG. 15. The elements in FIG. 14 which are identical to those shown in FIG. 8 are indicated by the same reference numerals and a description thereof is omitted. In this second embodiment, however, the motion detector 50 does not supply the estimated value for intra-coding to the predictive judging circuit 54, and the predictive judging circuit 54 selects only one of forward inter-picture prediction, backward inter-picture prediction or bi-directional inter-picture prediction and does not select one of the frame and field predictive modes.

As shown in FIG. 15, input terminal 300 is supplied with picture signal data for every predictive mode of the current picture, on a macro-block by macro-block basis, from predictive mode switching circuit 52. The picture signal data are operated upon by frame DCT circuit 303 as if arranged into intra-coded frame-formatted blocks, each of which comprises an 8×8 array of pixels. The frame DCT circuit 303 orthogonally transforms each intra-coded frame-formatted block to form a respective array of 64 intra-coded frame-based DCT coefficients and supplies the coefficients to the DCT mode switching circuit 311.

The picture signal data of the current picture are also operated upon by field DCT circuit 304 as if arranged into intra-coded field-formatted blocks. The field DCT circuit 304 orthogonally transforms each intra-coded field-formatted block to form a respective array of 64 intra-coded field-based DCT coefficients.

The DCT mode switching circuit 311 selects, for every macro-block, either the arrays of intra-coded frame-based coefficients or the arrays of intra-coded field-based coefficients and supplies the selected coefficients to switch 315.

The techniques by which the DCT mode switching circuit 311 selects either the arrays of the intra-coded frame-based coefficients or the arrays of the intra-coded field-based coefficients essentially correspond to the first and second techniques performed by DCT mode switching circuit 255 of the first embodiment discussed in conjunction with FIG. 13. However, in the first technique of this second embodiment, circuit 311 calculates an Intra-Coded Frame Weight and an Intra-Coded Field Weight using only the 63 AC coefficients of each array of 64 frame-based coefficients and the 63 AC coefficients of each array of 64 field-based coefficients. The DCT mode switching circuit 311 supplies the selected one of the Intra-Coded Frame Weight and the Intra-Coded Field Weight to predictive judging circuit 319 as an Intra-Coding Weight.

The picture signal data are also supplied by input terminal 300 to selector 330, which in turn supplies the picture signal data to one of arithmetic units 353a, 353b and 353c as a function of the predictive mode selected by the predictive judging circuit 54.

If forward inter-picture prediction is selected by the predictive judging circuit 54, the picture signal data are supplied by the selector 330 to arithmetic unit 353a which subtracts a macro-block of a predictive picture supplied by input terminal 301 from a macro-block of the picture signal data to produce forward predictive coded data. The forward predictive coded data are operated upon by frame DCT circuit 305 as if arranged into forward predictive coded frame-formatted blocks, each of which comprises an 8×8 array of pixels. The frame DCT circuit 305 orthogonally transforms each forward predictive encoded frame-formatted block to form a respective array of 64 forward predictive encoded frame-based DCT coefficients and supplies the coefficients to the DCT mode switching circuit 312.

The forward predictive coded data is also operated upon by field DCT circuit 306 as if arranged into forward predictive encoded field-formatted blocks. The field DCT circuit 306 orthogonally transforms each forward predictive encoded field-formatted block to form a respective array of 64 forward predictive encoded field-based DCT coefficients and supplies the coefficients to the circuit 312.

The DCT mode switching circuit 312 selects, for every macro-block, either the arrays of forward predictive coded frame-based coefficients or the arrays of field-based forward predictive coded coefficients and supplies the selected coefficients to switch 315. The DCT mode switching circuit 312 selects one of the arrays in essentially the same manner used by DCT mode switching circuit 255 of the first embodiment. The DCT mode switching circuit 312 thus calculates a Forward Predictive Frame Weight and a Forward Predictive Field Weight, selects one of the weights, and supplies the selected weight to predictive judging circuit 319 as an Inter-Coding Weight.

If backward inter-picture prediction is selected by the predictive judging circuit 54, the picture signal data are supplied by the selector 330 to arithmetic unit 353b which subtracts a macro-block of a predictive picture supplied by input terminal 302 from a macro-block of the picture signal data to produce backward predictive coded data. The backward predictive coded data are operated upon by frame DCT circuit 307 as if arranged into backward predictive coded frame-formatted blocks, each of which comprises an 8×8 array of pixels. The frame DCT circuit 307 orthogonally transforms each backward predictive encoded frame-formatted block to form a respective array of 64 backward predictive encoded frame-based DCT coefficients and supplies the coefficients to the DCT mode switching circuit 313.

The backward predictive coded data are also operated upon by field DCT circuit 308 as if arranged into backward predictive encoded field-formatted blocks. The field DCT circuit 308 orthogonally transforms each backward predictive encoded field-formatted block to form a respective array of 64 backward predictive encoded field-based DCT coefficients and supplies the coefficients to the circuit 313.

The DCT mode switching circuit 313 selects, for every macro-block, either the arrays of backward predictive coded frame-based coefficients or the arrays of backward predictive coded field-based coefficients and supplies the selected coefficients to switch 315. The DCT mode switching circuit 313 selects one of the arrays in essentially the same manner used by DCT mode switching circuit 312. The DCT mode switching circuit 313 thereby calculates a Backward Predictive Frame Weight and a Backward Predictive Field Weight, selects one of the weights, and supplies the selected weight to predictive judging circuit 319 as the Inter-Coding Weight.

If bi-directional inter-picture prediction is selected by the predictive judging circuit 54, the picture signal data are supplied by the selector 330 to arithmetic unit 353c which subtracts the mean value of a macro-block of a forward predictive picture supplied by input terminal 301 and a macro-block of a backward predictive picture supplied by input terminal 302 from the picture signal data to produce bi-directional predictive coded data. The bi-directional predictive coded data are operated upon by frame DCT circuit 309 as if arranged into bi-directional predictive coded frame-formatted blocks, each of which comprises an 8×8 array of pixels. The frame DCT circuit 309 orthogonally transforms each bi-directional predictive encoded frame-formatted block to form a respective array of 64 bi-directional predictive encoded frame-based DCT coefficients and supplies the coefficients to the DCT mode switching circuit 314.

The bi-directional predictive coded data are also operated upon by field DCT circuit 310 as if arranged into bi-directional predictive encoded field-formatted blocks. The field DCT circuit 310 orthogonally transforms each bi-directional predictive encoded field-formatted block to form a respective array of 64 bi-directional predictive encoded DCT field-based coefficients and supplies the coefficients to the DCT mode switching circuit 314.

The DCT mode switching circuit 314 selects either the arrays of bi-directional predictive coded frame-based coefficients or the arrays of bi-directional predictive coded field-based coefficients and supplies the selected coefficients to switch 315. The DCT mode switching circuit 314 selects one of the arrays in essentially the same manner used by DCT mode switching circuit 312. The DCT mode switching circuit 314 thus calculates a Bi-directional Predictive Frame Weight and a Bi-directional Predictive Field Weight, selects one of the weights, and supplies the selected weight to predictive judging circuit 319 as the Inter-Coding Weight.

The predictive judging circuit 319 compares the value of the Inter-Coding Weight to a predetermined threshold value ($TH_2$). If the Inter-Coding Weight is of lesser value than $TH_2$, the orthogonal transformation corresponding to the Inter-Coding Weight is determined to represent the more efficient coding mode and DCT transformation mode.

If the value of the Inter-Coding Weight is greater than or equal to $TH_2$, the Inter-Coding Weight and the Intra-Coding Weight are compared. If the Inter-Coding Weight is of lesser value, the corresponding predictive mode coefficients are selected. Conversely, if the Intra-Coding Weight is of lesser value, the corresponding intra-coded coefficients are selected.

Alternatively, the Intra-Coding Weight and Inter-Coding Weight are compared using weighted values. As an example, if the relation:

$$\text{Inter-CodingWeight} < (\text{Intra-CodingWeight} * \beta_3) + \alpha_3,$$

is true, the corresponding inter-coding predictive encoding mode and frame-based or field-based orthogonal transformation is determined to be the most efficient mode and the corresponding DCT coefficient data is selected; if the relation is not true, the corresponding intra-coding coefficient data is selected. In this example, $\alpha_3$ and $\beta_3$ represent predetermined weighting values that are determined empirically.

The predictive judging circuit 319 sets the switch 315 to one of input contacts a,b,c and d to receive the selected one of the intra-coded frame-based, intra-coded field-based, forward predictive coded frame-based, forward predictive coded field-based, backward predictive coded frame-based, backward predictive coded field-based, bi-directional predictive coded frame-based, and bi-directional predictive coded field-based coefficient data, and switch 315 supplies the selected coefficient data to output terminal 318.

The selected coefficient data are supplied via output terminal 318 and further to quantizer 57, shown in FIG. 14, for further processing as described above regarding FIG. 8.

Although illustrative embodiments of the present invention, and various modifications thereof, have been described in detail herein with reference to the accompanying drawings, it is to be understood that the invention is not limited to this precise embodiment and the described modifications, and that various changes and further modifications may be effected therein by one skilled in the art without departing from the scope or spirit of the invention as defined in the appended claims.

What is claimed is:

1. A method of encoding picture signals comprising the steps of:

arranging picture signal data into frame-formatted blocks in which odd field data alternates with even field data;

orthogonally transforming said frame-formatted blocks to form frame-based coefficient data;

arranging said picture signal data into field-formatted blocks, each comprising either said odd field data or said even field data;

orthogonally transforming said field-formatted blocks to form field-based coefficient data;

determining whether the orthogonally transformed frame-based coefficient data or the orthogonally transformed field-based coefficient data contains a smaller quantity of data;

selecting said orthogonally transformed frame-based coefficient data or said orthogonally transformed field-based coefficient data having the smaller quantity of coefficient data; and encoding said selected orthogonally transformed coefficient data for transmission.

2. A method according to claim 1, further comprising the step of quantizing said selected data.

3. A method according to claim 1, wherein said picture signal data is arranged on a macro-block by macro-block basis into said frame-formatted blocks and into said field-formatted blocks, and wherein said selected data is selected on a macro-block by macro-block basis.

4. Apparatus for encoding picture signals comprising:

means for arranging picture signal data into frame-formatted blocks in which odd field data alternates with even field data;

means for orthogonally transforming said frame-formatted blocks to form frame-based coefficient data;

means for arranging said picture signal data into field-formatted blocks, each comprising either said odd field data or said even field data;

means for orthogonally transforming said field-formatted blocks to form field-based coefficient data;

means for determining whether the orthogonally transformed frame-based coefficient data or the orthogonally transformed field-based coefficient data contains a smaller quantity of data;

means for selecting said orthogonally transformed frame-based coefficient data or said orthogonally transformed field-based coefficient data which contains the smaller quantity of coefficient data; and means for encoding said selected orthogonally transformed coefficient data for transmission.

5. An apparatus according to claim 4, further comprising means for quantizing said selected data.

6. An apparatus according to claim 4, wherein said picture signal data is arranged on a macro-block by macro-block basis into said frame-formatted blocks and into said field-formatted blocks, and wherein said selected data is selected on a macro-block by macro-block basis.

7. A method of encoding picture signals comprising the steps of:

arranging picture signal data into frame-formatted blocks in which odd field data alternates with even field data;

orthogonally transforming said frame-formatted blocks to form arrays of frame-based coefficients, each respective array corresponding to one of said frame-formatted blocks and each array exhibiting a quantity of data;

combining the respective magnitudes of at least a portion of each array of frame-based coefficients to form a frame-based sum;

arranging said picture signal data into field-formatted blocks, each comprising one of said odd field data and said even field data;

orthogonally transforming said field-formatted blocks to form arrays of field-based coefficients, each respective array corresponding to one said field-formatted blocks and each array exhibiting a quantity of data;

combining the respective magnitudes of at least a portion of each array of field-based coefficients to form a field-based sum;

selecting the arrays exhibited by the smallest quantity of data from said arrays of frame-based coefficients and said arrays of field-based coefficients as a function of said frame-based sum and said field-based sum; and encoding said selected arrays for transmission.

8. A method according to claim 7, wherein said step of orthogonally transforming said frame-formatted blocks comprises discrete cosine transforming said frame-formatted blocks, and wherein said step of orthogonally transforming said field-formatted blocks comprises discrete cosine transforming said field-formatted blocks.

9. A method according to claim 7, wherein said picture signal data include luminance data and color difference data, and wherein each of said frame-formatted blocks and each of said field-formatted blocks represents either said luminance data or said color difference data and said field-formatted blocks which represent said color difference data comprise odd field data separated from even field data.

10. A method according to claim 7, wherein the magnitude of a frame-based coefficient is an absolute value of the frame-based coefficient and wherein the magnitude of a field-based coefficient is an absolute value of the field-based coefficient.

11. A method according to claim 7, wherein the magnitude of a frame-based coefficient is a squared value of the frame-based coefficient and wherein the magnitude of a field-based coefficient is a squared value of the field-based coefficient.

12. A method according to claim 7, wherein said portion of each array of frame-based coefficients and said portion of each array of field-based coefficients comprise high frequency coefficients.

13. A method according to claim 7, wherein said frame-based coefficients are selected when said frame-based sum has a value less than a predetermined threshold value.

14. A method according to claim 7, wherein said frame-based coefficients are selected when said frame-based sum is of lesser value than said field-based sum; and said field-based coefficients are selected when said frame-based sum is of greater value than said field-based sum.

15. A method according to claim 7, wherein said frame-based coefficients are selected when:

$$Sum_{frame} < Sum_{field} * \beta + \alpha,$$

wherein:

$Sum_{frame}$=said frame-based sum, $Sum_{field}$=said field-based sum, and $\beta$, $\alpha$=predetermined values;

and wherein said field-based coefficients are selected when:

$$Sum_{frame} \geq Sum_{field} * \beta + \alpha.$$

16. Apparatus for encoding picture signals comprising:

means for inputting picture signal data;

means for arranging said picture signal data into frame-formatted blocks in which odd field data alternates with even field data;

means for orthogonally transforming said frame-formatted blocks to form arrays of frame-based coefficients, each respective array corresponding to one of said frame-formatted blocks and each array exhibiting a quantity of data;

means for combining the respective magnitudes of at least a portion of each array of frame-based coefficients to form a frame-based sum;

means for arranging said picture signal data into field-formatted blocks, each comprising one of said odd field data and said even field data;

means for orthogonally transforming said field-formatted blocks to form arrays of field-based coefficients, each respective array corresponding to one said field-formatted block and each array exhibiting a quantity of data;

means for combining the respective magnitudes of at least a portion of each array of field-based coefficients to form a field-based sum;

means for selecting from said arrays of frame-based coefficients and said arrays of field-based coefficients the arrays exhibited by the smallest quantity of data as a function of said frame-based sum and said field based sum; and means for encoding said selected arrays for transmission.

17. An apparatus according to claim 16, wherein said means for orthogonally transforming said frame-formatted blocks comprises discrete cosine transforming said frame-formatted blocks, and wherein said means for orthogonally transforming said field-formatted blocks comprises discrete cosine transforming said field-formatted blocks.

18. An apparatus according to claim 16, wherein said picture signal data include luminance data and color difference data, and wherein each of said frame-formatted blocks and each of said field-formatted blocks represents either said luminance data or said color difference data and said field-formatted blocks which represent said color difference data comprise odd field data separated from even field data.

19. An apparatus according to claim 16, wherein the magnitude of a frame-based coefficient is an absolute value of the frame-based coefficient and wherein the magnitude of a field-based coefficient is an absolute value of the field-based coefficient.

20. An apparatus according to claim 16, wherein the magnitude of a frame-based coefficient is a squared value of the frame-based coefficient and wherein the magnitude of a field-based coefficient is a squared value of the field-based coefficient.

21. An apparatus according to claim 16, wherein said portion of each array of frame-based coefficients and said portion of each array of field-based coefficients comprise high frequency coefficients.

22. An apparatus according to claim 16, wherein said frame-based coefficients are selected when said frame-based sum has a value less than a predetermined threshold value.

23. An apparatus according to claim 16, wherein said frame-based coefficients are selected when said frame-based sum is of lesser value than said field-based sum; and said field-based coefficients are selected when said frame-based sum is of greater value than said field-based sum.

24. An apparatus according to claim 16, wherein said frame-based coefficients are selected when:

$$Sum_{frame} < Sum_{field} * \beta + \alpha,$$

wherein:

$Sum_{frame}$=said frame-based sum, $Sum_{field}$=said field-based sum, and $\beta$, $\alpha$=predetermined values;

and wherein said field-based coefficients are selected when:

$$Sum_{frame} \geq Sum_{field} * \beta + \alpha.$$

25. A method of encoding successive frames of picture signals comprising the steps of:

arranging said picture signal data into intra-coded frame-formatted blocks and into inter-coded frame-formatted blocks in which odd field data alternates with even field data;

orthogonally transforming said intra-coded frame-formatted blocks and said inter-coded frame-formatted blocks to respectively form intra-coded frame-based coefficient data and inter-coded frame-based coefficient data;

arranging said picture signal data into intra-coded field-formatted blocks and into inter-coded field-formatted blocks, each comprising either said odd field data or said even field data;

orthogonally transforming said intra-coded field-formatted blocks and said inter-coded field-formatted blocks to respectively form intra-coded field-based coefficient data and inter-coded field-based coefficient data;

determining whether the orthogonally transformed intra-coded frame-based coefficient data, the orthogonally transformed inter-coded frame-based coefficient data, the orthogonally transformed intra-coded field-based coefficient data or the orthogonally transformed inter-coded field-based coefficient data contains the smallest quantity of data;

selecting said orthogonally transformed intra-coded frame-based coefficient data, said orthogonally transformed inter-coded frame-based coefficient data, said orthogonally transformed intra-coded field-based coefficient data or said orthogonally transformed inter-coded field-based coefficient data which contains the smallest quantity of coefficient data; and encoding said selected orthogonally transformed coefficient data for transmission.

26. A method according to claim 25, wherein said step of orthogonally transforming said intra-coded frame-formatted blocks and said inter-coded frame-formatted blocks comprises discrete cosine transforming said intra-coded frame-formatted blocks and said inter-coded frame-formatted blocks, and wherein said step of orthogonally transforming said intra-coded field-formatted blocks and said inter-coded field-formatted blocks comprises discrete cosine transforming said intra-coded field-formatted blocks and said inter-coded field-formatted blocks.

27. A method according to claim 25, wherein said picture signal data include luminance data and color difference data; wherein each of said intra-coded frame-formatted blocks, each of said inter-coded frame-formatted blocks, each of said intra-coded field-formatted blocks, and each of said inter-coded field-formatted blocks represents either said luminance data or said color difference data; and wherein said intra-coded field-formatted blocks and said inter-coded field-formatted blocks which represent said color difference data comprise odd field data separated from even field data.

28. A method according to claim 25, wherein said step of selecting one from said intra-coded frame-based coefficient data, said inter-coded frame-based coefficient data, said intra-coded field-based coefficient data and said inter-coded field-based coefficient data comprises the steps of:

selecting one from said intra-coded frame-based coefficient data and said intra-coded field-based coefficient data having the smaller quantity of coefficient data as intra-coded coefficient data;

selecting one from said inter-coded frame-based coefficient data and said inter-coded field-based coefficient data having the smaller quantity of coefficient data as inter-coded coefficient data; and selecting from said intra-coded coefficient data and said inter-coded coefficient data the one having the smaller quantity of coefficient data.

29. A method of encoding successive frames of picture signals comprising the steps of:

arranging picture signal data into intra-coded frame-formatted blocks and inter-coded frame-formatted blocks in which odd field data alternates with even field data;

orthogonally transforming said intra-coded frame-formatted blocks and said inter-coded frame-formatted blocks to respectively form arrays of intra-coded frame-based coefficients and inter-coded frame-based coefficients, each array exhibiting a quantity of data;

combining the respective magnitudes of at least a portion of each array of said intra-coded frame-based coefficients and said inter-coded frame-based coefficients to respectively form an intra-coded frame-based sum and an inter-coded frame-based sum;

arranging picture signal data into intra-coded field-formatted blocks and inter-coded field-formatted blocks, each block comprising either said odd field data or said even field data;

orthogonally transforming said intra-coded field-formatted blocks and inter-coded field-formatted blocks to respectively form arrays of intra-coded field-based coefficients and inter-coded field-based coefficients, each array exhibiting a quantity of data;

combining the respective magnitudes of at least a portion of each array of said intra-coded field-based coefficients and said inter-coded field-based coefficients to respectively form an intra-coded field-based sum and an inter-coded field-based sum;

selecting from said arrays of intra-coded frame-based coefficients, inter-coded frame-based coefficients, intra-coded field-based coefficients and inter-coded field-based coefficients the arrays exhibited by the smallest quantity of data as a function of said intra-coded frame-based sum, said inter-coded frame-based sum, said intra-coded field-based sum and said inter-coded field-based sum; and encoding said selected arrays for transmission.

30. A method according to claim 29, wherein each of the magnitude of an intra-coded frame-based coefficient, the magnitude of an inter-coded frame-based coefficient, the magnitude of an intra-coded field-based coefficient, and the magnitude of an inter-coded field-based coefficient is an absolute value of the respective coefficient.

31. A method according to claim 29, wherein each of the magnitude of an intra-coded frame-based coefficient, the magnitude of an inter-coded frame-based coefficient, the magnitude of an intra-coded field-based coefficient, and the magnitude of an inter-coded field-based coefficient is a squared value of the respective coefficient.

32. A method according to claim 29, wherein each of said portion of each array of intra-coded frame-based coefficients, said portion of each array of inter-coded frame-based coefficients, said portion of each array or inter-coded field-based coefficients, and said portion of each array of intra-coded field-based coefficients comprise AC coefficients.

33. A method according to claim 29, wherein each of said portion of each array of intra-coded frame-based coefficients, said portion of each array of inter-coded frame-based coefficients, said portion of each array of inter-coded field-based coefficients, and said portion of each array of intra-coded field-based coefficients comprise high frequency coefficients.

34. A method according to claim 29, wherein said step of selecting from said arrays of intra-coded frame-based coefficients, inter-coded frame-based coefficients, intra-coded field-based coefficients and inter-coded field-based coefficients comprises the steps of:

selecting from said arrays of intra-coded frame-based coefficients and intra-coded field-based coefficients the arrays exhibited by the smallest quantity of data as a function of said intra-coded frame-based sum and said intra-coded field-based sum as intra-coded coefficient data and selecting the corresponding one of said intra-coded frame-based sum and said intra-coded field-based sum as an intra-coded sum;

selecting from said arrays of inter-coded frame-based coefficients and inter-coded field-based coefficients the arrays exhibited by the smallest quantity of data as a function of said inter-coded frame-based sum and said inter-coded field-based sum as inter-coded coefficient data and selecting the corresponding one of said inter-coded frame-based sum and said inter-coded field-based sum as an inter-coded sum; and selecting from said intra-coded coefficient data and said inter-coded coefficient data the arrays exhibited by the smallest quantity of data as a function of said intra-coded sum and said inter-coded sum.

35. A method according to claim 34, wherein said intra-coded frame-based coefficients are selected as said intra-coded coefficient data when said intra-coded frame-based sum is of lesser value than a first predetermined threshold value, and wherein said inter-coded frame-based coefficients are selected as said inter-coded coefficient data when said inter-coded frame-based sum is of lesser value than a second predetermined threshold value.

36. A method according to claim 34, wherein said intra-coded frame-based coefficients are selected as said intra-coded coefficient data when said intra-coded frame-based sum is of lesser value than said intra-coded field-based sum, and wherein said intra-coded field-based coefficients are selected as said intra-coded coefficient data when said intra-coded frame-based sum is of greater value than said intra-coded field-based sum; and wherein said inter-coded frame-based coefficients are selected as said inter-coded coefficient data when said inter-coded frame-based sum is of lesser value than said inter-coded field-based sum, and wherein said inter-coded field-based coefficients are selected as said inter-coded coefficient data when said inter-coded frame-based sum is of greater value than said inter-coded field-based sum.

37. A method according to claim 34, wherein said intra-coded frame-based coefficients are selected as said intra-coded coefficient data when:

$$Sum_{intra,frame} < Sum_{intra,field} * \beta + \alpha,$$

wherein:

$Sum_{intra,frame}$=said intra-coded frame-based sum, $Sum_{intra,field}$=said intra-coded field-based sum, and $\beta$, $\alpha$=predetermined values;

and wherein said intra-coded field-based coefficients are selected as said intra-coded coefficient data when:

$$Sum_{intra,frame} \geq Sum_{intra,field} * \beta + \alpha.$$

38. A method according to claim 34, wherein said inter-coded frame-based coefficients are selected as said inter-coded coefficient data when:

$$Sum_{inter,frame} < Sum_{inter,field} * \beta + \alpha,$$

wherein:

$Sum_{inter,frame}$=said inter-coded frame-based sum, $Sum_{inter,field}$=said inter-coded field-based sum, and $\beta$, $\alpha$=predetermined values;

and wherein said inter-coded field-based coefficients are selected as said inter-coded coefficient data when:

$$Sum_{inter,frame} \geq Sum_{inter,field} * \beta + \alpha.$$

39. Apparatus for encoding picture signals comprising:

means for inputting picture signal data;

means for arranging said picture signal data into intra-coded frame-formatted blocks and into inter-coded frame-formatted blocks in which odd field data alternates with even field data;

means for orthogonally transforming said intra-coded frame-formatted blocks and said inter-coded frame-formatted blocks to respectively form intra-coded frame-based coefficient data and inter-coded frame-based coefficient data;

means for arranging said picture signal data into intra-coded field-formatted blocks and into inter-coded field-formatted blocks, each comprising either said odd field data or said even field data;

means for orthogonally transforming said intra-coded field-formatted blocks and said inter-coded field-formatted blocks to respectively form intra-coded field-based coefficient data and inter-coded field-based coefficient data;

means for determining whether the orthogonally transformed intra-coded frame-based coefficient data, the orthogonally transformed inter-coded frame-based coefficient data, the orthogonally transformed intra-coded field-based coefficient data or the orthogonally transformed inter-coded field-based coefficient data contains the smallest quantity of data;

means for selecting said orthogonally transformed intra-coded frame-based coefficient data, said orthogonally transformed inter-coded frame-based coefficient data, said orthogonally transformed intra-coded field-based coefficient data or said orthogonally transformed inter-coded field-based coefficient data which contains the smallest quantity of coefficient data; and means for encoding said selected orthogonally transformed coefficient data for transmission.

\* \* \* \* \*